(12) United States Patent
Han et al.

(10) Patent No.: US 11,920,051 B2
(45) Date of Patent: Mar. 5, 2024

(54) COMPOSITION, FILM PREPARED THEREFROM, DISPLAY DEVICE PREPARED THEREFROM, ARTICLE PREPARED THEREFROM, AND METHOD OF PREPARING ARTICLE

(71) Applicant: Samsung Electronics Co., Ltd., Suwon-si (KR)

(72) Inventors: Jungim Han, Yongin-si (KR); Inki Kim, Hwaseong-si (KR); Byungha Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 730 days.

(21) Appl. No.: 16/941,987

(22) Filed: Jul. 29, 2020

(65) Prior Publication Data
US 2021/0261813 A1    Aug. 26, 2021

(30) Foreign Application Priority Data
Feb. 21, 2020   (KR) .................. 10-2020-0021774

(51) Int. Cl.
*C09D 171/02* (2006.01)
*C09D 5/00* (2006.01)

(52) U.S. Cl.
CPC ............ *C09D 171/02* (2013.01); *C09D 5/00* (2013.01)

(58) Field of Classification Search
CPC ...... C09D 171/02; C09D 5/00; C09D 171/00; C08G 65/33306; C08G 65/336;
(Continued)

(56) References Cited

U.S. PATENT DOCUMENTS 665,628 A    1/1901   Birch
5,627,292 A    5/1997   Armand et al.
(Continued)

FOREIGN PATENT DOCUMENTS

JP    H07258275 A    10/1995
KR    101909804 B1    10/2018
(Continued)

OTHER PUBLICATIONS

Jana Chocholoušová et al., "Acetic Acid Dimer in the Gas Phase, Nonpolar Solvent, Microhydrated Environment, and Dilute and Concentrated Acetic Acid: Ab Initio Quantum Chemical and Molecular Dynamics Simulations," J. Phys. Chem. A, Apr. 5, 2003, pp. 3086-3092, vol. 107, No. 17.
(Continued)

*Primary Examiner* — Prem C Singh
*Assistant Examiner* — Francis C Campanell
(74) *Attorney, Agent, or Firm* — CANTOR COLBURN LLP

(57) ABSTRACT

A composition comprising a silane compound represented by Formula 1 comprising a fluorine-containing (poly)ether group; and an amine compound represented by Formula 2 comprising a fluorine-containing (poly)ether group:

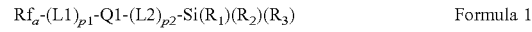

Formula 1

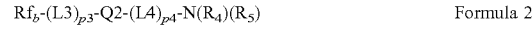

Formula 2 wherein $Rf_a$, $Rf_b$, Q1, Q2, L1 to L4, $R_1$ to $R_3$, $R_4$ to $R_5$, and p1 to p4 are as disclosed herein.

20 Claims, 4 Drawing Sheets

(58) Field of Classification Search
CPC .... C08G 65/007; C08G 77/46; C08G 65/226; C08G 65/325; C08G 65/328; C08G 73/024; C08G 77/24; C08G 77/452; C07F 7/0803; C07F 7/0834; C08J 5/18; G06F 3/041
USPC ........................................................ 525/526
See application file for complete search history.

(56) References Cited

U.S. PATENT DOCUMENTS

| | | |
|---|---|---|
| 7,094,471 B2 | 8/2006 | Moore et al. |
| 8,758,498 B2 | 6/2014 | Zastrau et al. |
| 2002/0071959 A1* | 6/2002 | Yamaguchi .......... C08G 65/336 428/447 |
| 2020/0056068 A1 | 2/2020 | Han et al. |
| 2020/0157376 A1 | 5/2020 | Hoshino et al. |
| 2021/0054149 A1 | 2/2021 | Kim et al. |
| 2021/0261738 A1 | 8/2021 | Park et al. |

FOREIGN PATENT DOCUMENTS

| | | | |
|---|---|---|---|
| KR | 1020180132845 A | 12/2018 | |
| KR | 1020210022978 A | 3/2021 | |
| WO | 0304247 A1 | 5/2003 | |
| WO | WO-2008105532 A1 * | 9/2008 | ........... A61K 8/0241 |
| WO | 2019039186 A1 | 2/2019 | |

OTHER PUBLICATIONS

Gregory R. Bogart et al., "Investigation of Amine-Catalyzed Alkoxysilane-Modified Cab-O-Sil by Drift Spectroscopy," Journal of Colloid and Interface Science, 1994, pp. 18-26, vol. 167.

* cited by examiner

COMPOSITION, FILM PREPARED THEREFROM, DISPLAY DEVICE PREPARED THEREFROM, ARTICLE PREPARED THEREFROM, AND METHOD OF PREPARING ARTICLE

CROSS-REFERENCE TO RELATED APPLICATION

This application claims priority to and the benefit of Korean Patent Application No. 10-2020-0021774, filed on Feb. 21, 2020 in the Korean Intellectual Property Office, and all the benefits accruing therefrom under 35 U.S.C. § 119, the content of which is incorporated herein in its entirety by reference.

BACKGROUND

1. Field

The present disclosure relates to a composition, a film prepared therefrom, a display device prepared therefrom, an article prepared therefrom, and a method of preparing the article.

2. Description of Related Art

A portable electronic device, such as a smart phone or a tablet PC, may include a functional layer having various functions.

Recently, a touch screen panel recognizing a contact position using a finger or a tool has become a universal means of interaction with a variety of touch screen panel systems.

Thus, a functional layer may be applied on the surface of a display panel to improve surface slipping and sense of touch for a touch screen panel.

However, performance of the functional layer may deteriorate due to continuous or frequent contact on the functional layer by a finger or a tool.

SUMMARY

Provided are compositions that can achieve an improved durability and phase stability.

Provided are films prepared by using the compositions.

Provided are display devices including the films prepared by using the compositions.

Provided are articles including the films prepared by using the compositions.

Provided are methods of preparing the articles.

Additional aspects will be set forth in part in the description which follows and, in part, will be apparent from the description, or may be learned by practice of the one or more exemplary embodiments of the disclosure.

According to an aspect of an embodiment, a composition includes a silane compound represented by Formula 1 comprising a fluorine-containing (poly)ether group; and an amine compound represented by Formula 2 comprising a fluorine-containing (poly)ether group:

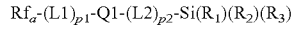
Formula 1

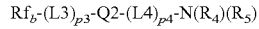
Formula 2

In Formulae 1 and 2, $Rf_a$ and $Rf_b$ are each independently a fluorine-containing (poly)ether group, Q1 is —N($R_a$)—C(=O)O—, —C(=O)—N($R_a$)—, —N($R_a$)—S(=O)O—, —S(=O)—N($R_a$)—, —OS(=O)—N($R_a$)—C(=O)O—, or —OC(=O)—N($R_a$)—S(=O)O—, Q2 is —N($R_b$)—C(=O)O—, —C(=O)—N($R_b$)—, —N($R_b$)—S(=O)O—, —S(=O)—N($R_b$)—, —OS(=O)—N($R_b$)—C(=O)O—, or —OC(=O)—N($R_b$)—S(=O)O—, $R_a$ is a hydrogen, a substituted or unsubstituted C1 to C20 alkyl group, a substituted or unsubstituted C6 to C20 aryl group, or -(L5)$_{p5}$-Si($R_7$)($R_8$)($R_9$), $R_b$ is a hydrogen, a substituted or unsubstituted C1 to C20 alkyl group, a substituted or unsubstituted C6 to C20 aryl group, or -(L6)$_{p6}$-N($R_{11}$)($R_{12}$), L1, L2, L3, L4, L5, and L6 are each independently a substituted or unsubstituted C1 to C20 alkylene group, a substituted or unsubstituted C1 to C20 oxyalkylene group, or a combination thereof, p1, p2, p3, p4, p5, and p6 are each independently an integer of 1 to 10, $R_2$, $R_3$, $R_7$, $R_8$, and $R_9$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, and $R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group, wherein at least one of $R_1$, $R_2$, and $R_3$ is a substituted or unsubstituted C1 to C20 alkoxy group, a halogen atom, or a hydroxyl group, and at least one of $R_7$, $R_8$, and $R_9$ is a substituted or unsubstituted C1 to C20 alkoxy group, a halogen atom, or a hydroxyl group.

According to an aspect of another embodiment, a composition includes an amine compound represented by Formula 2 including a fluorine-containing (poly)ether group:

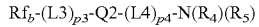
Formula 2

In Formula 2, $Rf_b$ is a fluorine-containing (poly)ether group,

Q2 is —N($R_b$)—C(=O)O—, —C(=O)—N($R_b$)—, —N($R_b$)—S(=O)O—, —S(=O)—N($R_b$)—, —OS(=O)—N($R_b$)—C(=O)O—, or —OC(=O)—N($R_b$)—S(=O)O—, $R_b$ is a hydrogen, a substituted or unsubstituted C1 to C20 alkyl group, a substituted or unsubstituted C6 to C20 aryl group, or -(L6)$_{p6}$-N($R_{11}$)($R_{12}$), L3, L4, and L6 are each independently a substituted or unsubstituted C1 to C20 alkylene group, a substituted or unsubstituted C1 to C20 oxyalkylene group, or a combination thereof, p3, p4, and p6 are each independently an integer of 1 to 10, and $R_4$, $R_5$, $R_{10}$, $R_{11}$, and $R_{12}$ are each independently a hydrogen, a substituted or unsubstituted C1 to C20 alkyl group, or a substituted or unsubstituted C6 to C20 aryl group.

According to an aspect of another embodiment, a film includes a product prepared by hydrolysis and polycondensation of a silane compound represented by Formula 1 including a fluorine-containing (poly)ether group, an amine compound represented by Formula 2 including a fluorine-containing (poly)ether group and a product prepared by hydrolysis and polycondensation of a silane compound represented by Formula 1 including a fluorine-containing (poly)ether group, or a product of hydrolysis and polycondensation of a silane compound represented by Formula 1 including a fluorine-containing (poly)ether group and an amine compound represented by Formula 2 including a fluorine-containing (poly)ether group:

$Rf_a\text{-}(L1)_{p1}\text{-}Q1\text{-}(L2)_{p2}\text{-}Si(R_1)(R_2)(R_3)$  Formula 1

$Rf_b\text{-}(L3)_{p3}\text{-}Q2\text{-}(L4)_{p4}\text{-}N(R_4)(R_5)$  Formula 2

In Formulae 1 and w, $Rf_a$ and $Rf_b$ are each independently a fluorine-containing (poly)ether group, Q1 is —N($R_a$)—C(=O)O—, —C(=O)—N($R_a$)—, —N($R_a$)—S(=O)O—, —S(=O)—N($R_a$)—, —OS(=O)—N($R_a$)—C(=O)O—, or —OC(=O)—N($R_a$)—S(=O)O—, Q2 is —N($R_b$)—C(=O)O—, —C(=O)—N($R_b$)—, —N($R_b$)—S(=O)O—, —S(=O)—N($R_b$)—, —OS(=O)—N($R_b$)—C(=O)O—, or —OC(=O)—N($R_b$)—S(=O)O—, $R_a$ is a hydrogen, a substituted or unsubstituted C1 to C20 alkyl group, a substituted or unsubstituted C6 to C20 aryl group, or -(L5)$_{p5}$-Si($R_7$)($R_8$)($R_9$), $R_b$ is a hydrogen, a substituted or unsubstituted C1 to C20 alkyl group, a substituted or unsubstituted C6 to C20 aryl group, or -(L6)$_{p6}$-N($R_{11}$)($R_{12}$), L1, L2, L3, L4, L5, and L6 are each independently a substituted or unsubstituted C1 to C20 alkylene group, a substituted or unsubstituted C1 to C20 oxyalkylene group, or a combination thereof, p1, p2, p3, p4, p5, and p6 are each independently an integer of 1 to 10, $R_2$, $R_3$, $R_7$, $R_8$, and $R_9$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, and $R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group, wherein at least one of $R_1$, $R_2$, and $R_3$ is a substituted or unsubstituted C1 to C20 alkoxy group, a halogen atom, or a hydroxyl group, and at least one of $R_7$, $R_8$, and $R_9$ is a substituted or unsubstituted C1 to C20 alkoxy group, a halogen atom, or a hydroxyl group.

According to an aspect of another embodiment, a display device includes a film including a product prepared by hydrolysis and polycondensation of a silane compound represented by Formula 1 including a fluorine-containing (poly)ether group, an amine compound represented by Formula 2 including a fluorine-containing (poly)ether group and a product prepared by hydrolysis and polycondensation of a silane compound represented by Formula 1 including a fluorine-containing (poly)ether group, or a product prepared by hydrolysis and polycondensation of a silane compound represented by Formula 1 including a fluorine-containing (poly)ether group and an amine compound represented by Formula 2 including a fluorine-containing (poly)ether group:

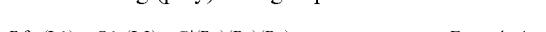

$Rf_a\text{-}(L1)_{p1}\text{-}Q1\text{-}(L2)_{p2}\text{-}Si(R_1)(R_2)(R_3)$  Formula 1

$Rf_b\text{-}(L3)_{p3}\text{-}Q2\text{-}(L4)_{p4}\text{-}N(R_4)(R_5)$  Formula 2

In Formulae 1 and 2, $Rf_a$ and $Rf_b$ are each independently a fluorine-containing (poly)ether group, Q1 is —N($R_a$)—C(=O)O—, —C(=O)—N($R_a$)—, —N($R_a$)—S(=O)O—, —S(=O)—N($R_a$)—, —OS(=O)—N($R_a$)—C(=O)O—, or —OC(=O)—N($R_a$)—S(=O)O—, Q2 is —N($R_b$)—C(=O)O—, —C(=O)—N($R_b$)—, —N($R_b$)—S(=O)O—, —S(=O)—N($R_b$)—, —OS(=O)—N($R_b$)—C(=O)O—, or —OC(=O)—N($R_b$)—S(=O)O—, $R_a$ is a hydrogen, a substituted or unsubstituted C1 to C20 alkyl group, a substituted or unsubstituted C6 to C20 aryl group, or -(L5)$_{p5}$-Si($R_7$)($R_8$)($R_9$), $R_b$ is a hydrogen, a substituted or unsubstituted C1 to C20 alkyl group, a substituted or unsubstituted C6 to C20 aryl group, or -(L6)$_{p6}$-N($R_{11}$)($R_{12}$), L1, L2, L3, L4, L5, and L6 are each independently a substituted or unsubstituted C1 to C20 alkylene group, a substituted or unsubstituted C1 to C20 oxyalkylene group, or a combination thereof, p1, p2, p3, p4, p5, and p6 are each independently an integer of 1 to 10, $R_2$, $R_3$, $R_7$, $R_8$, and $R_9$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, and $R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group, wherein at least one of $R_1$, $R_2$, and $R_3$ is a substituted or unsubstituted C1 to C20 alkoxy group, a halogen atom, or a hydroxyl group, and at least one of $R_7$, $R_8$, and $R_9$ is a substituted or unsubstituted C1 to C20 alkoxy group, a halogen atom, or a hydroxyl group.

According to an aspect of another embodiment, an article includes a substrate; and a film disposed on the substrate, wherein the film includes:

a product prepared by hydrolysis and polycondensation of a silane compound represented by Formula 1 including a fluorine-containing (poly)ether group, an amine compound represented by Formula 2 including a fluorine-containing (poly)ether group and a product prepared by hydrolysis and polycondensation of a silane compound represented by Formula 1 including a fluorine-containing (poly)ether group, or a product of hydrolysis and polycondensation of a silane compound represented by Formula 1 including a fluorine-containing (poly)ether group and an amine compound represented by Formula 2 including a fluorine-containing (poly)ether group:

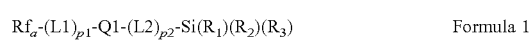

$Rf_a\text{-}(L1)_{p1}\text{-}Q1\text{-}(L2)_{p2}\text{-}Si(R_1)(R_2)(R_3)$  Formula 1

$Rf_b\text{-}(L3)_{p3}\text{-}Q2\text{-}(L4)_{p4}\text{-}N(R_4)(R_5)$  Formula 2

In Formulae 1 and 2, $Rf_a$ and $Rf_b$ are each independently a fluorine-containing (poly)ether group, Q1 is —N($R_a$)—C(=O)O—, —C(=O)—N($R_a$)—, —N($R_a$)—S(=O)O—, —S(=O)—N($R_a$)—, —OS(=O)—N($R_a$)—C(=O)O—, or —OC(=O)—N($R_a$)—S(=O)O—, Q2 is —N($R_b$)—C(=O)O—, —C(=O)—N($R_b$)—, —N($R_b$)—S(=O)O—, —S(=O)—N($R_b$)—, —OS(=O)—N($R_b$)—C(=O)O—, or —OC(=O)—N($R_b$)—S(=O)O—, $R_a$ is a hydrogen, a substituted or unsubstituted C1 to C20 alkyl group, a substituted or unsubstituted C6 to C20 aryl group, or -(L5)$_{p5}$-Si($R_7$)($R_8$)($R_9$), $R_b$ is a hydrogen, a substituted or unsubstituted C1 to C20 alkyl group, a substituted or unsubstituted C6 to C20 aryl group, or -(L6)$_{p6}$-N($R_{11}$)($R_{12}$), L1, L2, L3, L4, L5, and L6 are each independently a substituted or unsubstituted C1 to C20 alkylene group, a substituted or unsubstituted C1 to C20 oxyalkylene group, or a combination thereof, p1, p2, p3, p4, p5, and p6 are each independently an integer of 1 to 10, $R_1$, $R_2$, $R_3$, $R_7$, $R_8$, and $R_9$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, and $R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group, wherein at least one of $R_1$, $R_2$, and $R_3$ is a substituted or unsubstituted C1 to C20 alkoxy group, a halogen atom, or a hydroxyl group, and at least one of $R_7$, $R_8$, and $R_9$ is a substituted or unsubstituted C1 to C20 alkoxy group, a halogen atom, or a hydroxyl group.

According to an aspect of another embodiment, a method of preparing the article includes disposing the composition disclosed herein on a substrate to form a film.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
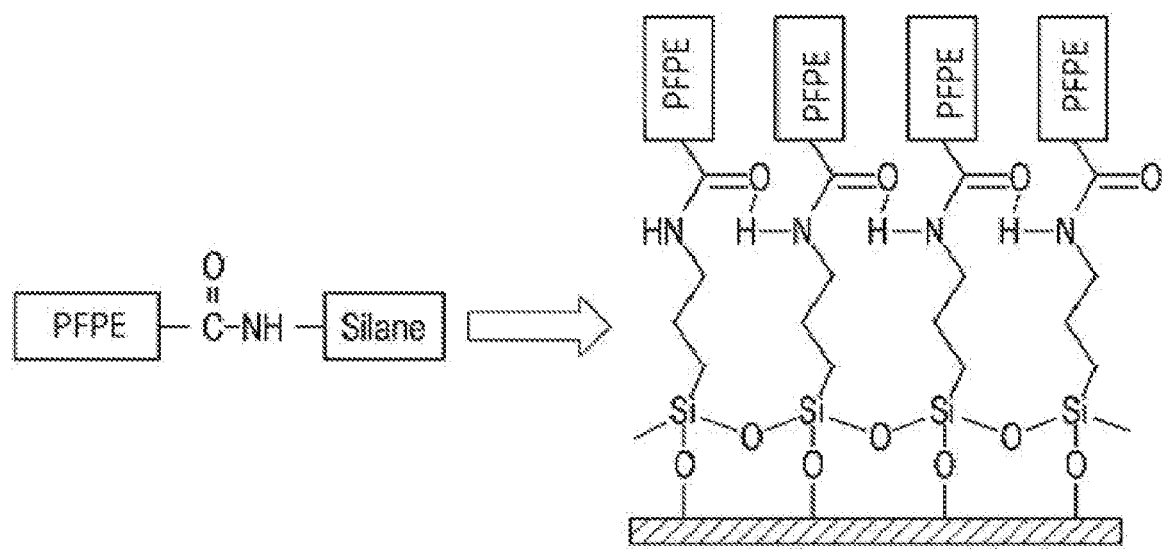
FIG. 1 is a schematic view that illustrates a structure of a film formed on a substrate using a composition according to one or more embodiments.

Exemplary embodiments will now be described in further detail with reference to the accompanying drawings. This disclosure, however, may be embodied in many different forms and should not be construed as limited to the exemplary embodiments set forth herein. Rather, these embodiments are provided so that this disclosure will be thorough and complete, and will fully convey the scope of the disclosure to one of ordinary skill in the art. It should be understood that embodiments described herein should be considered in a descriptive sense only and not for purposes of limitation. Descriptions of features or aspects within each embodiment should typically be considered as available for other similar features or aspects in other embodiments. Like reference numerals in the drawings denote like elements.

The terminology used herein is for the purpose of describing particular embodiments only and is not intended to be limiting. An expression used in the singular encompasses the expression of the plural including "at least one", unless it has a clearly different meaning in the context. The term "at least one" should not be understood as limiting to the singular. As used herein, the singular forms "a," "an" and "the" are intended to include the plural forms as well, unless the context clearly indicates otherwise. As used herein, the term "and/or" includes any and all combinations of one or more of the associated list items. It will be further understood that the terms "includes," "comprises," "including," and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when a component is referred to as being "on" another component, the component can be directly on the other component or intervening components may be present thereon. In contrast, when a component is referred to as being "directly on" another component, an intervening component is not present therebetween.

While such terms as "first," "second," "third", etc., may be used to describe various elements, components, regions, layers, and/or sections, such elements, components, regions, layers, and/or sections must not be limited to the above terms. The above terms are used only to distinguish one element, component, region, layer, or section from another element, component, region, layer, or section. Therefore, a first element, component, region, layer, or section described hereinafter may be referred to as a second element, component, region, layer, or section without departing from the teachings of the present disclosure.

Spatially relative terms, such as "beneath", "below", "lower", "above", and "upper", may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the drawings. For example, if the device in the figures is turned over, elements described as "below", or "beneath" other elements or features would then be oriented "above" the other elements or features. Thus, a term such as "below" can encompass both an orientation of above and below depending on the perspective of the observer. The device may be otherwise oriented (rotated 90 degrees or at other orientations), and the spatially relative descriptors used herein may be interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross-sectional illustrations that are schematic illustrations of idealized example embodiments. As such, variations from the shapes of the illustrations as a result, for example, of manufacturing techniques and/or tolerances, are to be expected. Thus, the exemplary embodiments should not be construed as limited to the particular shapes of regions illustrated herein but are to include deviations in shapes that result, for example, from manufacturing. For example, a region illustrated or described as flat may, typically, have rough and/or nonlinear features. Moreover, angles illustrated as sharp may be rounded. Thus, the regions illustrated in the drawings are schematic in nature and their shapes are not intended to illustrate the actual shape of a region and are not intended to limit the scope of the present description.

Hereinafter, according to one or more exemplary embodiments, a composition; a film; a display device; an article formed using the composition; and a method of preparing the article will be described in further detail.

Composition (I)

According to an embodiment, a composition includes a silane compound represented by Formula 1 including a fluorine-containing (poly)ether group; and an amine compound represented by Formula 2 including a fluorine-containing (poly)ether group:

$$Rf_a\text{-}(L1)_{p1}\text{-}Q1\text{-}(L2)_{p2}\text{-}Si(R_1)(R_2)(R_3) \quad \text{Formula 1}$$

$$Rf_b\text{-}(L3)_{p3}\text{-}Q2\text{-}(L4)_{p4}\text{-}N(R_4)(R_5) \quad \text{Formula 2}$$

In Formulae 1 and 2, $Rf_a$ and $Rf_b$ are each independently a fluorine-containing (poly)ether group, Q1 is —N($R_a$)—C(=O)O—, —C(=O)—N($R_a$)—, —N($R_a$)—S(=O)O—, —S(=O)—N($R_a$)—, —OS(=O)—N($R_a$)—C(=O)O—, or —OC(=O)—N($R_a$)—S(=O)O—, Q2 is —N($R_b$)—C(=O)O—, —C(=O)—N($R_b$)—, —N($R_b$)—S(=O)O—, —S(=O)—N($R_b$)—, —OS(=O)—N($R_b$)—C(=O)O—, or —OC(=O)—N($R_b$)—S(=O)O—, $R_a$ is a hydrogen, a substituted or unsubstituted C1 to C20 alkyl group, a substituted or unsubstituted C6 to C20 aryl group, or -(L5)$_{p5}$-Si($R_7$)($R_8$)($R_9$), $R_b$ is a hydrogen, a substituted or unsubstituted C1 to C20 alkyl group, a substituted or unsubstituted C6 to C20 aryl group, or -(L6)$_{p6}$-N($R_{11}$)($R_{12}$), L1, L2, L3, L4, L5, and L6 are each independently a substituted or unsubstituted C1 to C20 alkylene group, a substituted or unsubstituted C1 to C20 oxyalkylene group, or a combination thereof, p1, p2, p3, p4, p5, and p6 are each independently an integer of 1 to 10, $R_2$, $R_3$, $R_7$, $R_8$, and $R_9$ each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, and $R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group, wherein, at least one of $R_1$, $R_2$, and $R_3$ is a substituted or unsubstituted C1 to C20 alkoxy group, a halogen atom, or a hydroxyl group, and at least one of $R_7$, $R_8$, and $R_9$ is a substituted or unsubstituted C1 to C20 alkoxy group, a halogen atom, or a hydroxyl group.

The composition including a silane compound represented by Formula 1 including a fluorine-containing (poly)ether group and an amine compound represented by Formula 2 including a fluorine-containing (poly)ether group can be used as a material for coating a surface of a substrate. When a coating film is formed on a surface of a display, abrasion of the film due to contact by fingers may occur, and thus durability of the coating film and resultantly display may be deteriorated as time elapses. When the composition includes a silane compound represented by Formula 1 including a fluorine-containing (poly)ether group and an amine compound represented by Formula 2 including a fluorine-containing (poly)ether group at the same time, the amine compound may function as a catalyst of a hydrolysis reaction and/or a polycondensation reaction of the silane compound in the formation of the coating film, or may be used as a reactant of a hydrolysis reaction and/or a polycondensation reaction of the silane compound. In this regard, a coating film having enhanced hardness and improved durability may be obtained.

For example, an inside of a chamber during a deposition coating process is in a vacuum state, and thus the inside of a chamber provides substantially an anhydrous condition. The silane compound evaporated in the chamber may not proceed a hydrolysis reaction and/or a polycondensation reaction at a surface of a substrate by the silane compound alone. During the deposition coating process, reaction efficiency of the hydrolysis and/or polycondensation reactions occurred by the silane compound alone at a surface of a substrate may be deteriorated. Thus, durability of the coating film obtained from the hydrolysis and/or polycondensation reactions may also be deteriorated. In contrast, when a composition includes an amine compound in addition to a silane compound, the amine compound participates a hydrolysis reaction and/or a polycondensation reaction as a catalyst and/or a reactant, and thus reaction efficiency of the hydrolysis and/or polycondensation reactions of the silane compound may significantly improve. As a result, durability of the coating film thus obtained may improve.

For example, the silane compound represented by Formula 1 includes a linking group capable of forming a non-covalent interaction with adjacent molecules between a fluorine-containing (poly)ether moiety and a hydrolyzable silane group. In some embodiments, the amine compound represented by Formula 2 includes a linking group capable of forming a non-covalent interaction with adjacent molecules between a fluorine-containing (poly)ether moiety and an amine group When the composition includes the silane compound and the amine compound at the same time, inter-chain interaction of the adjacent molecules may be firmly maintained, and thus damage and/or destruction of the bonding of the plurality of fluorine-containing silane compounds due to frequent frictions may be reduced or prevented. Accordingly, the surface coating film may not be easily worn away due to the frequent frictions but have reinforced durability. In particular, when an unshared electron pair of an amino group or an amide group in the amine compound and a hydrogen atom of an amide group in the silane compound maintain a non-covalent interaction such as hydrogen bond, durability of the coating film formed using the composition may further improve.

When the composition according to an embodiment including a silane compound containing a fluorine-containing (poly)ether group and an amine compound containing a fluorine-containing (poly)ether group is used in a surface of a panel equipped in a display device, the composition may provide water repellent function and anti-fingerprint function and improved abrasion resistance and durability. Examples of the panel equipped in the display device may include a touch screen panel in a portable terminal, a panel in a liquid display device (LCD), and a panel in a plasma display panel (PDP).

Referring to FIG. 1, a substrate is coated with the composition according to an embodiment including a silane compound represented by Formula 1 including a fluorine-containing (poly)ether group, and thus a film is formed on the substrate. The silane compound including a fluorine-containing (poly)ether group is shown on the left side of FIG. 1 and has a perfluoro (poly)ether (PFPE) group as the fluorine-containing (poly)ether group and has a structure in which the PFPE group and a hydrolyzable silane group are linked by an amide bond (—C(=O)—NH—). The hydrolyzable silane group may be a silane group that is substituted with at least one hydrolyzable functional group. For example, the silane substituted with at least one hydrolyzable may be silane substituted with at least one substituted or unsubstituted C1 to C20 alkoxy group, a halogen atom, or a hydroxyl group. The hydrolyzable silane moiety may be bound to a substrate or a lower layer as shown on right side of FIG. 1 by a hydrolysis and/or polycondensation reaction during a coating or depositing process. The bond may be, for example, a covalent bond. When the hydrolyzable silane group has a hydrolyzable functional group, the hydrolysis and/or polycondensation reaction during a coating process proceeds, which forms a network formed of hydrolysis and/or polycondensation products. Examples of the hydrolyzable functional group may include a C1-C10 alkoxy group, a halogen atom, or a hydroxyl group and a C1-C8 alkoxy group, such as a methoxy group or an ethoxy group. In particular, a methoxy group has a high hydrolysis reactivity. When $R_a$ is $-(L5)_{p5}-Si(R_7)(R_8)(R_9)$, the silane compound represented by Formula 1 including a fluorine-containing (poly)ether group contains at least two silane groups, and thus a bond between adjacently-bound silane compounds may be stronger than that of a compound including one silane group. Therefore, a film formed using the silane compound may have further improved abrasion resistance. Also, as a hydrogen bond between amide bonds is formed, strength of a bond between the silane compounds may further increase.

In the silane compound represented by Formula 1 including a fluorine-containing (poly)ether group, for example, $Rf_a$ is perfluoroether or perfluoropolyether. In the amine compound represented by Formula 2 including a fluorine-containing (poly)ether group, for example, $Rf_b$ is perfluoroether or perfluoropolyether.

The fluorine-containing (poly)ether group in the silane compound of Formula 1 and/or the amine compound of Formula 2 may have, for example, a $CF_3(CF_2)_hO$— group at the end, and a —$(CF_2CF_2O)_i$— group, a —$(CF_2O)_j$— group, and a —$(CH_2O)_k$— group may be each bound directly or indirectly to the $CF_3(CF_2)_hO$— group in any order, where h and k are each independently an integer of 0 to 10; and i and j are each independently an integer of 1 to 100. The fluorine-containing (poly)ether group in the silane compound of Formula 1 and/or the amine compound of Formula 2 may have, for example, a $CF_3O$— group, a $CF_3CF_2O$— group, or a $CF_3CF_2CF_2O$— group at the terminal end, and a —$(CF_2CF_2O)_i$— group, a —$(CF_2O)_j$— group, and a —$(CH_2O)_k$— group may be each bound directly or indirectly to the $CF_3O$— group, the $CF_3CF_2O$— group, or the $CF_3CF_2CF_2O$— group in any order, where k is an integer of 0 to 10; and i and j are each independently an integer of 1 to 100. Here, for example, the order of groups refers to an order of a —$(CF_2CF_2O)_i$— group, a —$(CF_2O)_j$— group, and a —$(CH_2O)_k$— group are bound to each other and to the $CF_3O$— group, the $CF_3CF_2O$— group, or the $CF_3CF_2CF_2O$— group. For example, i and j are each independently an integer of 1 to 60, an integer of 5 to 55, an integer of 10 to 50, or an integer of 15 to 40 For example, a ratio of i and j may be 0.5 to 1.5, 0.6 to 1.4, 0.7 to 1.3, 0.8 to 1.2, 0.9 to 1.1, or about 1. For example, k is 0 or an integer of 1 to 9 or 2 to 5.

In the silane compound of Formula 1 and the amine compound of Formula 2, $Rf_a$ and $Rf_b$ may be each independently $CF_3O$—$(CF_2CF_2O)_j$—$(CF_2O)_j$—$(CH_2O)_k$—, $CF_3O$—$(CF_2O)_j$—$(CF_2CF_2O)_j$—$(CH_2O)_k$—, $CF_3CF_2O$—$(CF_2CF_2O)_j$—$(CF_2O)_j$—$(CH_2O)_k$—, $CF_3CF_2O$—$(CF_2O)_j$—$(CF_2CF_2O)_j$—$(CH_2O)_k$—, $CF_3CF_2CF_2O$—$(CF_2CF_2O)_j$—$(CF_2O)_j$—$(CH_2O)_k$—, or $CF_3CF_2CF_2O$—$(CF_2O)_j$—$(CF_2CF_2O)_i$—$(CH_2O)_k$—; wherein k is an integer of 0 to 10, and i and j are each independently an integer of 1 to 100, 1 to 60, an integer of 5 to 55, an integer of 10 to 50, or an integer of 15 to 40. For example, a ratio of i and j may be 0.5 to 1.5, 0.6 to 1.4, 0.7 to 1.3, 0.8 to 1.2, 0.9 to 1.1, or about 1. For example, k is 0 or an integer of 1 to 9 or 2 to 5.

In the silane compound of Formula 1 and the amine compound of Formula 2, $Rf_a$ and $Rf_b$ are each independently $CF_3O(CF_2CF_2O)_i(CF_2O)_jCH_2$—, $CF_3O(CF_2CF_2O)_i(CF_2O)_jCH_2OCH_2$—, or $CF_3O(CF_2CF_2O)_i(CF_2O)_jCF_2$—; and i and j are each independently an integer of 1 to 60, an integer of 5 to 55, an integer of 10 to 50, or an integer of 15 to 40. For example, a ratio of i and j may be 0.5 to 1.5, 0.6 to 1.4, 0.7 to 1.3, 0.8 to 1.2, 0.9 to 1.1, or about 1. For example, k is 0 or an integer of 1 to 9 or 2 to 5.

The silane compound represented by Formula 1 including a fluorine-containing (poly)ether group may be, for example, a silane compound represented by one of Formulae 3 and 4 including a fluorine-containing (poly)ether group:

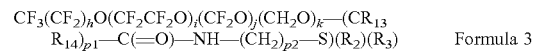

Formula 3

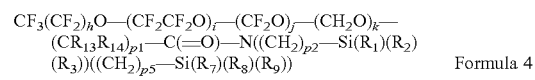

Formula 4

In Formulae 3 and 4, $R_{13}$ and $R_{14}$ are each independently a hydrogen, C1-C5 alkyl, a fluorine, or fluorinated C1-C5 alkyl group; p1, p2, and p5 are each independently an integer of 1 to 10; h and k are each independently an integer of 0 to 10; i and j are each independently an integer of 1 to 100; and $R_1$, $R_2$, $R_3$, $R_7$, $R_8$, and $R_9$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, wherein at least one of $R_1$, $R_2$, and $R_3$ is a substituted or unsubstituted C1 to C20 alkoxy group, a halogen atom, or a hydroxyl group, and at least one of $R_7$, $R_8$, and $R_9$ is a substituted or unsubstituted C1 to C20 alkoxy group, a halogen atom, or a hydroxyl group. For example, p1, p2, and p5 are each independently an integer of 1 to 9, an integer of 1 to 5, an integer of 1 to 3, or an integer of 1 to 2. For example, i and j are each independently an integer of 1 to 60, an integer of 5 to 55, an integer of 10 to 50, or an integer of 15 to 40. For example, a ratio of i and j may be 0.5 to 1.5, 0.6 to 1.4, 0.7 to 1.3, 0.8 to 1.2, 0.9 to 1.1, or about 1. For example, k is 0 or an integer of 1 to 9 or 2 to 5.

The amine compound represented by Formula 2 including a fluorine-containing (poly)ether group may be, for example, an amine compound represented by one of Formulae 5 and 6 including a fluorine-containing (poly)ether group:

$$CF_3(CF_2)_hO(CF_2CF_2O)_i(CF_2O)_j(CH_2O)_k—(CR_{15}R_{16})_{p3}—C(=O)—NH—(CH_2)_{p4}—N(R_4)(R_5) \quad \text{Formula 5}$$

$$CF_3(CF_2)_hO(CF_2CF_2O)_i(CF_2O)_j(CH_2O)_k—(CR_{15}R_{16})_{p3}—C(=O)—N((CH_2)_{p4}—N(R_4)(R_5))((CH_2)_{p6}—N(R_{11})(R_{12})) \quad \text{Formula 6}$$

In Formulae 5 and 6, $R_{15}$ and $R_{16}$ are each independently a hydrogen, a C1-C5 alkyl, a fluorine, or a fluorinated C1-C5 alkyl group; p3, p4, and p6 are each independently an integer of 1 to 10; h and k are each independently an integer of 0 to 10; i and j are each independently an integer of 1 to 100; and $R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group. For example, p3, p4, and p6 are each independently an integer of 1 to 9, an integer of 1 to 5, an integer of 1 to 3, or an integer of 1 to 2. For example, i and j are each independently an integer of 1 to 60, an integer of 5 to 55, an integer of 10 to 50, or an integer of 15 to 40. For example, a ratio of i and j may be 0.5 to 1.5, 0.6 to 1.4, 0.7 to 1.3, 0.8 to 1.2, 0.9 to 1.1, or about 1. For example, k is 0 or an integer of 1 to 9 or 2 to 5.

The silane compound represented by Formula 1 including a fluorine-containing (poly)ether group may be, for example,
$CF_3O(CF_2CF_2O)_i(CF_2O)_j—(CH_2)—C(=O)NH—(CH_2)_2—Si(OCH_3)(OCH_3)(OCH_3)$,
$CF_3O(CF_2CF_2O)_i(CF_2O)_j—(CH_2OCH_2)—C(=O)NH—(CH_2)_2—Si(OCH_3)(OCH_3)(OCH_3)$,
$CF_3O(CF_2CF_2O)_i(CF_2O_j—(CF_2)—C(=O)NH—(CH_2)_2—Si(OCH_3)(OCH_3)(OCH_3)$,
$CF_3O(CF_2CF_2O)_i(CF_2O)_j—(CH_2)—C(=O)NH—(CH_2)_2—Si(OCH_3)(OCH_3)(CH_3)$,
$CF_3O(CF_2CF_2O)_i(CF_2O)_j—(CH_2OCH_2)—C(=O)NH—(CH_2)_2—Si(OCH_3)(OCH_3)(CH_3)$,
$CF_3O(CF_2CF_2O)_i(CF_2O_j—(CF_2)—C(=O)NH—(CH_2)_2—Si(OCH_3)(OCH_3)(CH_3)$,
$CF_3CF_2O(CF_2CF_2O)_i(CF_2O)_j—(CH_2)—C(=O)NH—(CH_2)_2—Si(OCH_3)(OCH_3)(OCH_3)$,
$CF_3CF_2O(CF_2CF_2O)_i(CF_2O)_j—(CH_2OCH_2)—C(=O)NH—(CH_2)_2—Si(OCH_3)(OCH_3)(OCH_3)$,
$CF_3CF_2O(CF_2CF_2O)_i(CF_2O_j—(CF_2)—C(=O)NH—(CH_2)_2—Si(OCH_3)(OCH_3)(OCH_3)$,
$CF_3CF_2O(CF_2CF_2O)_i(CF_2O)_j—(CH_2)—C(=O)NH—(CH_2)_2—Si(OCH_3)(OCH_3)(CH_3)$,
$CF_3CF_2O(CF_2CF_2O)_i(CF_2O)_j—(CH_2OCH_2)—C(=O)NH—(CH_2)_2—Si(OCH_3)(OCH_3)(CH_3)$,
$CF_3CF_2O(CF_2CF_2O)_i(CF_2O)_j—(CF_2)—C(=O)NH—(CH_2)_2—Si(OCH_3)(OCH_3)(CH_3)$,
$CF_3CF_2CF_2O(CF_2CF_2O)_i(CF_2O)_j—(CH_2)—C(=O)NH—(CH_2)_2—Si(OCH_3)(OCH_3)(OCH_3)$,
$CF_3CF_2CF_2O(CF_2CF_2O)_i(CF_2O)_j—(CH_2OCH_2)—C(=O)NH—(CH_2)_2—Si(OCH_3)(OCH_3)(OCH_3)$,
$CF_3CF_2CF_2O(CF_2CF_2O)_i(CF_2O)_j—(CF_2)—C(=O)NH—(CH_2)_2—Si(OCH_3)(OCH_3)(OCH_3)$,
$CF_3CF_2CF_2O(CF_2CF_2O)_i(CF_2O)_j—(CH_2)—C(=O)NH—(CH_2)_2—Si(OCH_3)(OCH_3)(CH_3)$,
$CF_3CF_2CF_2O(CF_2CF_2O)_i(CF_2O)_j—(CH_2OCH_2)—C(=O)NH—(CH_2)_2—Si(OCH_3)(OCH_3)(CH_3)$,
$CF_3CF_2CF_2O(CF_2CF_2O)_i(CF_2O)_j—(CF_2)—C(=O)NH—(CH_2)_2—Si(OCH_3)(OCH_3)(CH_3)$,
$CF_3O(CF_2CF_2O)_i(CF_2O)_j—(CF_2)—C(=C)NHCH_2)_2—SOCH_3)(OCH_3))_2$,
$CF_3O(CF_2CF_2O)_i(CF_2O)_j—(CH_2OCH_2)—CN(—(CH_2)_2—Si(OCH_3)(OCH_3)(OCH_3))_2$,
$CF_3O(CF_2CF_2O)_i(CF_2O)_j—(CF_2)—C(=C)N(—(CH_2)_2—SOCH_3)(OCH_3)(OCH_3))_2$,
$CF_3O(CF_2CF_2O)_i(CF_2O)_j—(CH_2)—C(=C)N(—(CH_2)_2—Si(OCH_3)(OCH_3)(CH_3))_2$,
$CF_3O(CF_2CF_2O)_i(CF_2O)_j—(CH_2OCH_2)—C(=O)N(—(CH_2)_2—SOCH_3)(OCH_3)(CH_3))_2$,
$CF_3O(CF_2CF_2O)_i(CF_2O)_j—(CF_2)—C(=NH_2)_2—SOCH_3)(OCH_3)(CH_3))_2$,
$CF_3CF_2O(CF_2CF_2O)_j(CF_2O)_j—(CH_2)—C(=C)N(—(CH_2)_2—SOCH_3)(OCH_3)(OCH_3))_2$,
$CF_3CF_2O(CF_2CF_2O)_j(CF_2O)_j—(CH_2OCH_2)—C(=O)N(—(CH_2)_2—SOCH_3)(OCH_3)(OCH_3))_2$,
$CF_3CF_2O(CF_2CF_2O)_j(CF_2O)_j—(CF_2)—C(=NH_2)_2—SOCH_3)(OCH_3)(OCH_3))_2$,
$CF_3CF_2O(CF_2CF_2O)_j(CF_2O)_j—(CH_2)—C(=C)N(—(CH_2)_2—SOCH_3)(OCH_3)(CH_3))_2$,
$CF_3CF_2O(CF_2CF_2O)_j(CF_2O)_j—(CH_2OCH_2)—C(=O)NHCH_2)_2—Si(OCH_3)(OCH_3)(CH_3))_2$,
$CF_3CF_2O(CF_2CF_2O)_j(CF_2O)_j—(CF_2)—C(=O)N)_j(CH_2)_2—Si(OCH_3)(OCH_3)(CH_3))_2$,
$CF_3CF_2CF_2O(CF_2CF_2O)_j(CF_2O)_j—(CH_2)—C(=O)NHCH_2)_2—Si(OCH_3)(OCH_3)(OCH_3))_2$,
$CF_3CF_2CF_2O(CF_2CF_2O)_i(CF_2O)_j—(CH_2OCH_2)—C(=O)NHCH_2)_2—Si(OCH_3)(OCH_3)(OCH_3))_2$,
$CF_3CF_2CF_2O(CF_2CF_2O)_i(CF_2O)_j—(CF_2)—C(=O)NHCH_2)_2—Si(OCH_3)(OCH_3)(OCH_3))_2$,
$CF_3CF_2CF_2O(CF_2CF_2O)_i(CF_2O)_j—(CH_2)—C(=O)NHCH_2)_2—Si(OCH_3)(OCH_3)(CH_3))_2$,
$CF_3CF_2CF_2O(CF_2CF_2O)_i(CF_2O)_j—(CH_2OCH_2)—C(=O)NHCH_2)_2—Si(OCH_3)(OCH_3)(CH_3))_2$,
or $CF_3CF_2CF_2O(CF_2CF_2O)_i(CF_2O_j—(CF_2)—C(=O)N(—(CH_2)_2—Si(OCH_3)(OCH_3)(CH_3))_2$, where i and j are each independently an integer of 1 to 100, an integer of 1 to 60, an integer of 5 to 55, an integer of 10 to 50, or an integer of 15 to 40. For example, a ratio of i and j may be 0.5 to 1.5, 0.6 to 1.4, 0.7 to 1.3, 0.8 to 1.2, 0.9 to 1.1, or about 1.

The amine compound represented by Formula 2 including a fluorine-containing (poly)ether group may be, for example,
$CF_3O(CF_2CF_2O)_i(CF_2O)_j—(CH_2)—C(=O)NH(CH_2)_2—NH_2$,
$CF_3O(CF_2CF_2O)_i(CF_2O)_j—(CH_2OCH_2)—C(=O)NH—(CH_2)_2—NH_2$,
$CF_3O(CF_2CF_2O)_i(CF_2O)_j—(CF_2)—C(=O)NH—(CH_2)_2—NH_2$,
$CF_3O(CF_2CF_2O)N(CF_2O)_j—(CH_2)—C(=O)NH—(CH_2)_2—NHCH_3$,
$CF_3O(CF_2CF_2O)_i(CF_2O)_j—(CH_2OCH_2)—C(=O)NH—(CH_2)_2—NHCH_3$,
$CF_3O(CF_2CF_2O)_i(CF_2O)_j—(CF_2)—C(=O)NH—(CH_2)_2—NHCH_3$,
$CF_3O(CF_2CF_2O)_i(CF_2O)_j—(CH_2)—C(=O)NH—(CH_2)_2—N(CH_3)_2$,
$CF_3O(CF_2CF_2O)_i(CF_2O)_j—(CH_2OCH_2)—C(=O)NH—(CH_2)_2—N(CH_3)_2$,
$CF_3O(CF_2CF_2O)_i(CF_2O)_j—(CF_2)—C(=O)NH—(CH_2)_2—N(CH_3)_2$,
$CF_3CF_2O(CF_2CF_2O)_i(CF_2O)_j—(CH_2)—C(=O)NH—(CH_2)_2—NH_2$,
$CF_3CF_2O(CF_2CF_2O)_i(CF_2O)_j—(CH_2OCH_2)—C(=O)NH—(CH_2)_2—NH_2$,
$CF_3CF_2O(CF_2CF_2O)_i(CF_2O)_j—(CF_2)—C(=O)NH—(CH_2)_2—NH_2$,
$CF_3CF_2O(CF_2CF_2O)_i(CF_2O)_j—(CH_2)—C(=O)NH—(CH_2)_2—NHCH_3$,
$CF_3CF_2O(CF_2CF_2O)_i(CF_2O)_j—(CH_2OCH_2)—C(=O)NH—(CH_2)_2—NHCH_3$, $CF_3CF_2O(CF_2CF_2O)_i(CF_2O)_j$—$(CF_2)$—$C(=O)NH$—$(CH_2)_2$—$NHCH_3$, $CF_3CF_2O(CF_2CF_2O)_i(CF_2O)_j$—$(CH_2)$—$C(=O)NH$—$(CH_2)_2$—$N(CH_3)_2$, $CF_3CF_2O(CF_2CF_2O)_i(CF_2O)_j$—$(CH_2OCH_2)$—$C(=O)NH$—$(CH_2)_2$—$N(CH_3)_2$, $CF_3CF_2O(CF_2CF_2O)_i(CF_2O)_j$—$(CF_2)$—$C(=O)NH$—$(CH_2)_2$—$N(CH_3)_2$, $CF_3CF_2CF_2O(CF_2CF_2O)_i(CF_2O)_j$—$(CH_2)$—$C(=O)NH$—$(CH_2)_2$—$NH_2$, $CF_3CF_2CF_2O(CF_2CF_2O)_i(CF_2O)_j$—$(CH_2OCH_2)$—$C(=O)NH$—$(CH_2)_2$—$NH_2$, $CF_3CF_2CF_2O(CF_2CF_2O)_i(CF_2O)_j$—$(CF_2)$—$C(=O)NH$—$(CH_2)_2$—$NH_2$, $CF_3CF_2CF_2O(CF_2CF_2O)_i(CF_2O)_j$—$(CH_2)$—$C(=O)NH$—$(CH_2)_2$—$NHCH_3$, $CF_3CF_2CF_2O(CF_2CF_2O)_i(CF_2O)_j$—$(CH_2OCH_2)$—$C(=O)NH$—$(CH_2)_2$—$NHCH_3$, $CF_3CF_2CF_2O(CF_2CF_2O)_i(CF_2O)_j$—$(CF_2)$—$C(=O)NH$—$(CH_2)_2$—$NHCH_3$, $CF_3CF_2CF_2O(CF_2CF_2O)_i(CF_2O)_j$—$(CH_2)$—$C(=O)NH$—$(CH_2)_2$—$N(CH_3)_2$, $CF_3CF_2CF_2O(CF_2CF_2O)_i(CF_2O)_j$—$(CH_2OCH_2)$—$C(=O)NH$—$(CH_2)_2$—$N(CH_3)_2$, $CF_3CF_2CF_2O(CF_2CF_2O)_i(CF_2O)_j$—$(CF_2)$—$C(=O)NH$—$(CH_2)_2$—$N(CH_3)_2$, $CF_3O(CF_2CF_2O)_i(CF_2O)_j$—$(CH_2)$—$C(=O)N(-(CH_2)_2$—$NH_2)_2$, $CF_3O(CF_2CF_2O)_i(CF_2O)_j$—$(CH_2OCH_2)$—$C(=O)N(-(CH_2)_2$—$NH_2)_2$, $CF_3O(CF_2CF_2O)_i(CF_2O)_j$—$(CF_2)$—$C(=O)N(-(CH_2)_2$—$NH_2)_2$, $CF_3O(CF_2CF_2O)_i(CF_2O)_j$—$(CH_2)$—$C(=O)N(-(CH_2)_2$—$NHCH_3)_2$, $CF_3O(CF_2CF_2O)_i(CF_2O)_j$—$(CH_2OCH_2)$—$C(=O)N(-(CH_2)_2$—$NHCH_3)_2$, $CF_3O(CF_2CF_2O)_i(CF_2O)_j$—$(CF_2)$—$C(=O)N(-(CH_2)_2$—$NHCH_3)_2$, $CF_3O(CF_2CF_2O)_i(CF_2O)_j$—$(CH_2)$—$C(=O)N(-(CH_2)_2$—$N(CH_3)_2)_2$, $CF_3O(CF_2CF_2O)_i(CF_2O)_j$—$(CH_2OCH_2)$—$C(=O)N(-(CH_2)_2$—$N(CH_3)_2)_2$, $CF_3O(CF_2CF_2O)_i(CF_2O)_j$—$(CF_2)$—$C(=O)N(-(CH_2)_2$—$N(CH_3)_2)_2$, $CF_3CF_2O(CF_2CF_2O)_i(CF_2O)_j$—$(CH_2)$—$C(=O)N(-(CH_2)_2$—$NH_2)_2$, $CF_3CF_2O(CF_2CF_2O)_i(CF_2O)_j$—$(CH_2OCH_2)$—$C(=O)N(-(CH_2)_2$—$NH_2)_2$, $CF_3CF_2O(CF_2CF_2O)_i(CF_2O)_j$—$(CF_2)$—$C(=O)N(-(CH_2)_2$—$NH_2)_2$, $CF_3CF_2O(CF_2CF_2O)_i(CF_2O)_j$—$(CH_2)$—$C(=O)N(-(CH_2)_2$—$NHCH_3)_2$, $CF_3CF_2O(CF_2CF_2O)_i(CF_2O)_j$—$(CH_2OCH_2)$—$C(=O)N(-(CH_2)_2$—$NHCH_3)_2$, $CF_3CF_2O(CF_2CF_2O)_i(CF_2O)_j$—$(CF_2)$—$C(=O)N(-(CH_2)_2$—$NHCH_3)_2$, $CF_3CF_2O(CF_2CF_2O)_i(CF_2O)_j$—$(CH_2)$—$C(=O)N(-(CH_2)_2$—$N(CH_3)_2)_2$, $CF_3CF_2O(CF_2CF_2O)_i(CF_2O)_j$—$(CH_2OCH_2)$—$C(=O)N(-(CH_2)_2$—$N(CH_3)_2)_2$, $CF_3CF_2O(CF_2CF_2O)_i(CF_2O)_j$—$(CF_2)$—$C(=O)N(-(CH_2)_2$—$N(CH_3)_2)_2$, $CF_3CF_2CF_2O(CF_2CF_2O)_i(CF_2O)_j$—$(CH_2)$—$C(=O)N(-(CH_2)_2$—$NH_2)_2$, $CF_3CF_2CF_2O(CF_2CF_2O)_i(CF_2O)_j$—$(CH_2OCH_2)$—$C(=O)N(-(CH_2)_2$—$NH_2)_2$, $CF_3CF_2CF_2O(CF_2CF_2O)_i(CF_2O)_j$—$(CF_2)$—$C(=O)N(-(CH_2)_2$—$NH_2)_2$, $CF_3CF_2CF_2O(CF_2CF_2O)_i(CF_2O)_j$—$(CH_2)$—$C(=O)N(-(CH_2)_2$—$NHCH_3)_2$, $CF_3CF_2CF_2O(CF_2CF_2O)_i(CF_2O)_j$—$(CH_2OCH_2)$—$C(=O)N(-(CH_2)_2$—$NHCH_3)_2$, $CF_3CF_2CF_2O(CF_2CF_2O)_i(CF_2O)_j$—$(CF_2)$—$C(=O)N(-(CH_2)_2$—$NHCH_3)_2$, $CF_3CF_2CF_2O(CF_2CF_2O)_i(CF_2O)_j$—$(CH_2)$—$C(=O)N(-(CH_2)_2$—$N(CH_3)_2)_2$, $CF_3CF_2CF_2O(CF_2CF_2O)_i(CF_2O)_j$—$(CH_2OCH_2)$—$C(=O)N(-(CH_2)_2$—$N(CH_3)_2)_2$, or $CF_3CF_2CF_2O(CF_2CF_2O)_i(CF_2O)_j$—$(CF_2)$—$C(=O)N(-(CH_2)_2$—$N(CH_3)_2)_2$, where i and j are each independently an integer of 1 to 100, an integer of 1 to 60, an integer of 5 to 55, an integer of 10 to 50, or an integer of 15 to 40. For example, a ratio of i and j may be 0.5 to 1.5, 0.6 to 1.4, 0.7 to 1.3, 0.8 to 1.2, 0.9 to 1.1, or about 1.

In the silane compound represented by Formula 1, a weight average molecular weight of the fluorine-containing (poly)ether group may be, for example, 1,000 grams per mole (g/mol) to 10,000 g/mol, 2,000 g/mol to 9,000 g/mol, 3,000 g/mol to 8,000 g/mol, 3,000 g/mol to 7,000 g/mol, or 3,000 g/mol to 6,000 g/mol, as determined by gel permeation chromatography (GPC) using polystyrene standards. In the amine compound represented by Formula 2, a weight average molecular weight of the fluorine-containing (poly)ether group may be, for example, 1,000 g/mol to 10,000 g/mol, 2.000 g/mol to 9,000 g/mol, 3,000 g/mol to 8,000 g/mol, 3,000 g/mol to 7,000 g/mol, or 3.000 g/mol to 6,000 g/mol, as determined by gel permeation chromatography (GPC) using polystyrene standards.

In the composition including the silane compound represented by Formula 1 and the amine compound represented by Formula 2, a molar ratio of the silane compound represented by Formula 1 and the amine compound represented by Formula 2 may be, for example, 1:0.05 to 1:1, 1:0.05 to 1:0.5, 1:0.05 to 1:0.3, 1:0.05 to 1:0.2, or 1:0.05 to 1:0.15.

The composition including the silane compound represented by Formula 1 and the amine compound represented by Formula 2 may be in a liquid state or a gaseous state.

For example, the composition including the silane compound represented by Formula 1 and the amine compound represented by Formula 2 in a liquid state may be provided on to a substrate. In the composition of a liquid state, a molar ratio of the silane compound represented by Formula 1 and the amine compound represented by Formula 2 may be, for example, 1:0.05 to 1:1, 1:0.05 to 1:0.5, 1:0.05 to 1:0.3, 1:0.05 to 1:0.2, or 1:0.05 to 1:0.15.

In some embodiments, after the silane compound represented by Formula 1 and the amine compound represented by Formula 2 are prepared in separate containers in a liquid state, the compounds may each be evaporated and supplied to a mixing chamber through a supply line and may be mixed to obtain a composition in a gaseous state, and the composition in a gaseous state may be provided to a surface of a substrate. A molar ratio of the composition in a gaseous state that includes the silane compound represented by Formula 1 and the amine compound represented by Formula 2 and is obtained in a chamber may be, for example, 1:0.05 to 1:1, 1:0.05 to 1:0.5, 1:0.05 to 1:0.3, 1:0.05 to 1:0.2, or 1:0.05 to 1:0.15. A molar ratio of the composition in a gaseous state may be determined as a molar mixing ratio according to supplying rates of the vaporized silane compound and the vaporized amine compound supplied to the chamber. A pressure in the chamber may be equal to or lower than atmospheric pressure. The pressure in the chamber may be, for example, about 101325 Pascal (Pa) or lower, about 10000 Pa or lower, about 5000 Pa or lower, about 1000 Pa or lower, about 500 Pa or lower, about 100 Pa or lower, about 50 Pa or lower, or about 10 Pa or lower.

Composition (II)

According to another embodiment, a composition includes an amine compound represented by Formula 2 including a fluorine-containing (poly)ether group:

$$Rf_b\text{-}(L3)_{p3}\text{-}Q2\text{-}(L4)_{p4}\text{-}N(R_4)(R_5) \quad \text{Formula 2}$$

In Formula 2, $Rf_b$ is a fluorine-containing (poly)ether group; Q2 is $-N(R_b)-C(=O)O-$, $-C(=O)-N(R_b)-$, $-N(R_b)-S(=O)O-$, $-S(=O)-N(R_b)-$, $-OS(=O)-N(R_b)-C(=O)O-$, or $-OC(=O)-N(R_b)-S(=O)O-$; $R_b$ is a hydrogen, a substituted or unsubstituted C1 to C20 alkyl group, a substituted or unsubstituted C6 to C20 aryl group, or $-(L6)_{p6}-N(R_{11})(R_{12})$; L3, L4, and L6 are each independently a substituted or unsubstituted C1 to C20 alkylene group, a substituted or unsubstituted C1 to C20 oxyalkylene group, or a combination thereof; p3, p4, and p6 are each independently an integer of 1 to 10; and $R_4$, $R_5$, $R_{10}$, $R_{11}$, and $R_{12}$ are each independently a hydrogen, a substituted or unsubstituted C1 to C20 alkyl group, or a substituted or unsubstituted C6 to C20 aryl group.

The amine compound represented by Formula 2 including a fluorine-containing (poly)ether group may be, for example, an amine compound represented by one of Formulae 5 and 6 including a fluorine-containing (poly)ether group:

$$CF_3(CF_2)_hO(CF_2CF_2O)_i(CF_2O)_j(CH_2O)_k-(CR_{15}R_{16})_{p3}-C(=O)-NH-(CH_2)_{p4}-N(R_4)(R_5) \quad \text{Formula 5}$$

$$CF_3(CF_2)_hO(CF_2CF_2O)_i(CF_2O)_j(CH_2O)_k-(CR_{15}R_{16})_{p3}-C(=O)-N((CH_2)_{p4}-N(R_4)(R_5))((CH_2)_{p6}-N(R_{11})(R_{12})) \quad \text{Formula 6}$$

In Formulae 5 and 6, $R_{15}$ and $R_{16}$ are each independently a hydrogen, a C1-C5 alkyl, a fluorine, or a fluorinated C1-C5 alkyl group; p3, p4, and p6 are each independently an integer of 1 to 10; h and k are each independently an integer of 0 to 10; i and j are each independently an integer of 1 to 100; and $R_4$, $R_5$, $R_{10}$, $R_{11}$, and $R_{12}$ are each independently a hydrogen, a substituted or unsubstituted C1 to C20 alkyl group, or a substituted or unsubstituted C6 to C20 aryl group. For example, p3, p4, and p6 are each independently an integer of 1 to 9, an integer of 1 to 5, an integer of 1 to 3, or an integer of 1 to 2. For example, i and j are each independently an integer of 1 to 60, an integer of 5 to 55, an integer of 10 to 50, or an integer of 15 to 40. For example, a ratio of i and j may be 0.5 to 1.5, 0.6 to 1.4, 0.7 to 1.3, 0.8 to 1.2, 0.9 to 1.1, or about 1. For example, k may be 0 or an integer of 1 to 9 or an integer of 2 to 5.

The amine compound represented by Formula 2 including a fluorine-containing (poly)ether group may be, for example,
$CF_3O(CF_2CF_2O)_i(CF_2O)_j-(CH_2)-C(=O)NH-(CH_2)_2-NH_2$,
$CF_3O(CF_2CF_2O)_i(CF_2O)_j-(CH_2OCH_2)-C(=O)NH-(CH_2)_2-NH_2$,
$CF_3O(CF_2CF_2O)_i(CF_2O)_j-(CF_2)-C(=O)NH-(CH_2)_2-NH_2$,
$CF_3O(CF_2CF_2O)N(CF_2O)_j-(CH_2)-C(=O)NH-(CH_2)_2-NHCH_3$,
$CF_3O(CF_2CF_2O)_i(CF_2O)_j-(CH_2OCH_2)-C(=O)NH-(CH_2)_2-NHCH_3$,
$CF_3O(CF_2CF_2O)_i(CF_2O)_j-(CF_2)-C(=O)NH-(CH_2)_2-NHCH_3$,
$CF_3O(CF_2CF_2O)_i(CF_2O)_j-(CH_2)-C(=O)NH-(CH_2)_2-N(CH_3)_2$,
$CF_3O(CF_2CF_2O)_i(CF_2O)_j-(CH_2OCH_2)-C(=O)NH-(CH_2)_2-N(CH_3)_2$,
$CF_3O(CF_2CF_2O)_i(CF_2O)_j-(CF_2)-C(=O)NH-(CH_2)_2-N(CH_3)_2$,
$CF_3CF_2O(CF_2CF_2O)_i(CF_2O)_j-(CH_2)-C(=O)NH-(CH_2)_2-NH_2$,
$CF_3CF_2O(CF_2CF_2O)_i(CF_2O)_j-(CH_2OCH_2)-C(=O)NH-(CH_2)_2-NH_2$,
$CF_3CF_2O(CF_2CF_2O)_i(CF_2O)_j-(CF_2)-C(=O)NH-(CH_2)_2-NH_2$,
$CF_3CF_2O(CF_2CF_2O)_i(CF_2O)_j-(CH_2)-C(=O)NH-(CH_2)_2-NHCH_3$,
$CF_3CF_2O(CF_2CF_2O)_i(CF_2O)_j-(CH_2OCH_2)-C(=O)NH-(CH_2)_2-NHCH_3$,
$CF_3CF_2O(CF_2CF_2O)_i(CF_2O)_j-(CF_2)-C(=O)NH-(CH_2)_2-NHCH_3$,
$CF_3CF_2O(CF_2CF_2O)_i(CF_2O)_j-(CH_2)-C(=O)NH-(CH_2)_2-N(CH_3)_2$,
$CF_3CF_2O(CF_2CF_2O)_i(CF_2O)_j-(CH_2OCH_2)-C(=O)NH-(CH_2)_2-N(CH_3)_2$,
$CF_3CF_2O(CF_2CF_2O)_i(CF_2O)_j-(CF_2)-C(=O)NH-(CH_2)_2-N(CH_3)_2$,
$CF_3CF_2CF_2O(CF_2CF_2O)_i(CF_2O)_j-(CH_2)-C(=O)NH-(CH_2)_2-NH_2$,
$CF_3CF_2CF_2O(CF_2CF_2O)_i(CF_2O)_j-(CH_2OCH_2)-C(=O)NH-(CH_2)_2-NH_2$,
$CF_3CF_2CF_2O(CF_2CF_2O)_i(CF_2O)_j-(CF_2)-C(=O)NH-(CH_2)_2-NH_2$,
$CF_3CF_2CF_2O(CF_2CF_2O)_i(CF_2O)_j-(CH_2)-C(=O)NH-(CH_2)_2-NHCH_3$,
$CF_3CF_2CF_2O(CF_2CF_2O)_i(CF_2O)_j-(CH_2OCH_2)-C(=O)NH-(CH_2)_2-NHCH_3$,
$CF_3CF_2CF_2O(CF_2CF_2O)_i(CF_2O)_j-(CF_2)-C(=O)NH-(CH_2)_2-NHCH_3$,
$CF_3CF_2CF_2O(CF_2CF_2O)_i(CF_2O)_j-(CH_2)-C(=O)NH-(CH_2)_2-N(CH_3)_2$,
$CF_3CF_2CF_2O(CF_2CF_2O)_i(CF_2O)_j-(CH_2OCH_2)-C(=O)NH-(CH_2)_2-N(CH_3)_2$, or
$CF_3CF_2CF_2O(CF_2CF_2O)_i(CF_2O)_j-(CF_2)-C(=O)NH-(CH_2)_2-N(CH_3)_2$, where i and j are each independently an integer of 1 to 100, an integer of 1 to 60, an integer of 5 to 55, an integer of 10 to 50, or an integer of 15 to 40. For example, a ratio of I and j may be 0.5 to 1.5, 0.6 to 1.4, 0.7 to 1.3, 0.8 to 1.2, 0.9 to 1.1, or about 1.

The composition including an amine compound represented by Formula 2 including a fluorine-containing (poly)ether group may further include a silane compound represented by Formula 7:

$$Rf_c\text{-}(L7)_{p7}\text{-}Q3\text{-}(L8)_{p8}\text{—}Si(R_{13})(R_{14})\text{-}(L9)_{p9}\text{—}Si(R_{15})(R_{16})(R_{17}) \quad \text{Formula 7}$$

In Formula 7, $Rf_c$ is a fluorine-containing (poly)ether group;

Q3 is $-O-$, $-C(=O)O-$, $-O-C(=O)O-$, $-NR_cC(=O)O-$, $-C(=O)NR_c-$, $-OC(=O)NR_cS(=O)O-$, or $-CH_2(C_6H_4)C(=O)-$; each $R_c$ is independently a hydrogen, a substituted or unsubstituted C1 to C20 alkyl group, or a substituted or unsubstituted C6 to C20 aryl group, L7 and L9 are each independently a substituted or unsubstituted C1 to C20 alkylene group, a substituted or unsubstituted C1 to C20 oxyalkylene group, or a combination thereof;

L8 is a substituted or unsubstituted C1 to C20 alkylene group, a substituted or unsubstituted C1 to C20 oxyalkylene group, —$(CH_2)_m$—NH—$(CH_2)_n$—, or a combination thereof, where m and n are each independently an integer of 1 to 10;

p7 to p9 are each independently an integer of 1 to 10; and $R_{13}$ to $R_{17}$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group;

wherein at least one of $R_{13}$ to $R_{17}$ is a substituted or unsubstituted C1 to C20 alkoxy group, a halogen atom, or a hydroxyl group, or at least one of $R_{15}$ to $R_{17}$ is -$(L10)_{p10}$—Si$(R_{18})(R_{19})(R_{20})$ or -$(L10)_{p10}$—Si$(R_{21})(R_{22})$-$(L11)_{p11}$—Si$(R_{18})(R_{19})(R_{20})$, and the rest of $R_{15}$ to $R_{17}$ are each independently a substituted or unsubstituted C1 to C20 alkoxy group, a halogen atom, or a hydroxyl group, $R_{18}$ to $R_{22}$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, wherein when $R_{15}$ to $R_{17}$ are all -$(L10)_{p10}$—Si$(R_{18})(R_{19})(R_{20})$ or -$(L10)_{p10}$—Si$(R_{21})(R_{22})$-$(L11)_{p11}$—Si$(R_{18})(R_{19})(R_{20})$, at least one of $R_{20}$ to $R_{22}$ is a substituted or unsubstituted C1 to C20 alkoxy group, a halogen atom, or a hydroxyl group, L10 and L11 are each independently a substituted or unsubstituted C1 to C20 alkylene group, a substituted or unsubstituted C1 to C20 oxyalkylene group, or a combination thereof, and p10 and p11 are each independently an integer of 1 to 10.

In the definition of $Rf_c$, it is to be understood that "the fluorine-containing (poly)ether group" can be a fluorine-containing ether group or a fluorine-containing polyether group.

The fluorine-containing (poly)ether group in the silane compound represented by Formula 7 may be, for example, $CF_3O$—$(CF_2CF_2O)_n$—$(CF_2O)_m$—, $CF_3O$—$(CF_2O)_m$—$(CF_2CF_2O)_n$—, $CF_3CF_2O$—$(CF_2CF_2O)_n$—$(CF_2O)_m$—, $CF_3CF_2O$—$(CF_2O)_m$—$(CF_2CF_2O)_n$—, $CF_3CF_2CF_2O$—$(CF_2CF_2O)_n$—$(CF_2O)_m$—, or $CF_3CF_2CF_2O$—$(CF_2O)_m$—$(CF_2CF_2O)_n$—. Here, m and n are each independently, for example, an integer of 1 to 100, an integer of 1 to 60, an integer of 5 to 55, an integer of 10 to 50, or an integer of 15 to 40.

The fluorine-containing (poly)ether group in the silane compound represented by Formula 7 may be, for example,
$CF_3O$—$(CF_2CF_2O)_n$—$(CF_2O)_m$—$(CF_2CF_2CF_2O)_n$—,
$CF_3O$—$(CF_2O)_m$—$(CF_2CF_2O)_n$—$(CF_2CF_2CF_2O)_n$—,
$CF_3O$—$(CF_2CF_2O)_n$—$(CF_2O)_m$—$(CF_2CF_2CF_2CF_2O)_n$—$(CF_2CF_2CF_2O)_n$—,
$CF_3O$—$(CF_2O)_m$—$(CF_2CF_2O)_n$—$(CF_2O)_m$—$(CF_2CF_2CF_2CF_2O)_n$—$(CF_2CF_2CF_2O)_n$—
$CF_3CF_2O$—$(CF_2CF_2O)_n$—$(CF_2O)_m$—$(CF_2CF_2CF_2O)_n$—,
$CF_3CF_2O$—$(CF_2O)_m$—$(CF_2CF_2O)_n$—$(CF_2CF_2CF_2O)_n$—,
$CF_3CF_2O$—$(CF_2CF_2O)_n$—$(CF_2O)_m$—$(CF_2CF_2CF_2CF_2O)_n$—$(CF_2CF_2CF_2O)_n$—,
$CF_3CF_2O$—$(CF_2O)_m$—$(CF_2CF_2O)_n$—$(CF_2O)_m$—$(CF_2CF_2CF_2CF_2O)_n$—$(CF_2CF_2CF_2O)_n$—,
$CF_3CF_2CF_2O$—$(CF_2CF_2O)_n$—$(CF_2O)_m$—$(CF_2CF_2CF_2O)_n$—,
$CF_3CF_2CF_2O$—$(CF_2O)_m$—$(CF_2CF_2O)_n$—$(CF_2CF_2CF_2O)_n$—,
$CF_3CF_2CF_2O$—$(CF_2CF_2O)_n$—$(CF_2O)_m$—$(CF_2CF_2CF_2CF_2O)_n$—$(CF_2CF_2CF_2O)_n$—, or
$CF_3CF_2CF_2O$—$(CF_2O)_m$—$(CF_2CF_2O)_n$—$(CF_2O)_m$—$(CF_2CF_2CF_2CF_2O)_n$—$(CF_2CF_2CF_2O)_n$—. For example, m and n are each independently an integer of 1 to 100, an integer of 1 to 60, an integer of 5 to 55, an integer of 10 to 50, or an integer of 15 to 40.

For example, $Rf_c$ in the silane compound represented by Formula 7 may be $CF_3O(CF_2CF_2O)_n(CF_2O)_mCF_2$—, where n and m are each independently an integer of 1 to 100, an integer of 1 to 60, an integer of 5 to 55, an integer of 10 to 50, or an integer of 15 to 40.

The silane compound represented by Formula 7 may be, for example, $CF_3O(CF_2CF_2O)_n(CF_2O)_m$—$(CR_{23}R_{24})_{p7}$—C$(=O)NH$—$(CH_2)_{p10}$—NH—$(CH_2)_{p11}$—Si$(R_{13})(R_{14})$—$(CH_2)_{p9}$—Si$(R_{15})(R_{16})(R_{17})$, where n and m are each independently an integer of 1 to 100, an integer of 1 to 50, an integer of 1 to 30, an integer of 1 to 20, an integer of 1 to 10, or an integer of 1 to 5. $R_{23}$ and $R_{24}$ are each independently a hydrogen, a C1-C5 alkyl, a fluorine, or a fluorinated C1-C5 alkyl group; p7 and p9 to p11 are each independently an integer of 1 to 10; and $R_{13}$ to $R_{17}$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, wherein at least one of $R_{13}$ to $R_{17}$ is a C1 to C20 alkoxy group, a halogen atom, or a hydroxyl group. For example, p7, p9, p10, and p11 are each independently an integer of 1 to 10, an integer of 1 to 5, an integer of 1 to 3, or an integer of 1 to 2.

The silane compound represented by Formula 7 including a fluorine-containing (poly)ether group may be, for example,
$CF_3O(CF_2CF_2O)_n(CF_2O)_m$—$(CH_2)_2$—C$(=O)NH$—$(CH_2)_2$—NH—$(CH_2)_3$—Si$(OCH_3)(OCH_3)$—$CH_2$—Si$(OCH_3)(OCH_3)(OCH_3)$, $CF_3O(CF_2CF_2O)_n(CF_2O)_m$—$(CF_2)_2$—C$(=O)NH$—$(CH_2)_2$—NH—$(CH_2)_3$—Si$(OCH_3)(OCH_3)$—$CH_2$—Si$(OCH_3)(OCH_3)(OCH_3)$, $CF_3O(CF_2CF_2O)_n(CF_2O)_m$—$(CH_2)_2$—C$(=O)NH$—$(CH_2)_2$—NH—$(CH_2)_3$—Si$(OCH_3)(OCH_3)$—$CH_2$—Si$(OCH_3)(OCH_3)(CH_3)$, $CF_3O(CF_2CF_2O)_n(CF_2O)_m$—$(CF_2)_2$—C$(=O)NH$—$(CH_2)_2$—NH—$(CH_2)_3$—Si$(OCH_3)(OCH_3)$—$CH_2$—Si$(OCH_3)(OCH_3)(CH_3)$, $CF_3CF_2O(CF_2CF_2O)_n(CF_2O)_m$—$(CH_2)_2$—C$(=O)NH$—$(CH_2)_2$—NH—$(CH_2)_3$—Si$(OCH_3)(OCH_3)$—$CH_2$—Si$(OCH_3)(OCH_3)(OCH_3)$, $CF_3CF_2O(CF_2CF_2O)_n(CF_2O)_m$—$(CF_2)_2$—C$(=O)NH$—$(CH_2)_2$—NH—$(CH_2)_3$—Si$(OCH_3)(OCH_3)$—$CH_2$—Si$(OCH_3)(OCH_3)(OCH_3)$, $CF_3CF_2O(CF_2CF_2O)_n(CF_2O)_m$—$(CH_2)_2$—C$(=O)NH$—$(CH_2)_2$—NH—$(CH_2)_3$—Si$(OCH_3)(OCH_3)$—$CH_2$—Si$(OCH_3)(OCH_3)(CH_3)$, $CF_3CF_2O(CF_2CF_2O)_n(CF_2O)_m$—$(CF_2)_2$—C$(=O)NH$—$(CH_2)_2$—NH—$(CH_2)_3$—Si$(OCH_3)(OCH_3)$—$CH_2Si(OCH_3)(OCH_3)(CH_3)$, $CF_3CF_2CF_2O(CF_2CF_2O)_n(CF_2O)_m$—$(CH_2)_2$—C$(=O)NH$—$(CH_2)_2$—NH—$(CH_2)_3$—Si$(OCH_3)(OCH_3)$—$CH_2$—Si$(OCH_3)(OCH_3)(OCH_3)$, $CF_3CF_2CF_2O(CF_2CF_2O)_n(CF_2O)_m$—$(CF_2)_2$—C$(=O)NH$—$(CH_2)_2$—NH—$(CH_2)_3$—Si$(OCH_3)(OCH_3)$—$CH_2$—Si$(OCH_3)(OCH_3)(OCH_3)$, $CF_3CF_2CF_2O(CF_2CF_2O)_n(CF_2O)_m$—$(CH_2)_2$—C$(=O)NH$—$(CH_2)_2$—NH—$(CH_2)_3$—Si$(OCH_3)(OCH_3)$—$CH_2$—Si$(OCH_3)(OCH_3)(CH_3)$, or $CF_3CF_2CF_2O(CF_2CF_2O)_n(CF_2O)_m$—$(CF_2)_2$—C$(=O)NH$—$(CH_2)_2$—NH—$(CH_2)_3$—Si$(OCH_3)(OCH_3)$—$CH_2Si(OCH_3)(OCH_3)(CH_3)$.

For example, the silane compound represented by Formula 7 may include a linking group capable of forming a non-covalent interaction with adjacent molecules between the fluorine-containing (poly)ether moiety and a hydrolyzable silane group. Also, the amine compound represented by Formula 2 may include a linking group capable of forming a non-covalent interaction with adjacent molecules between the fluorine-containing (poly)ether moiety and an amine group. When the composition includes the silane compound represented by Formula 7 and the amine compound represented by Formula 2 at the same time, inter-chain interaction of the adjacent molecules may be firmly maintained, and thus damage and/or destruction of the bonding of the plurality of fluorine-containing silane compounds due to frequent friction may be reduced or prevented. Accordingly, the surface coating film may not be easily worn away due to the frequent friction but have reinforced durability.

Figure 2:
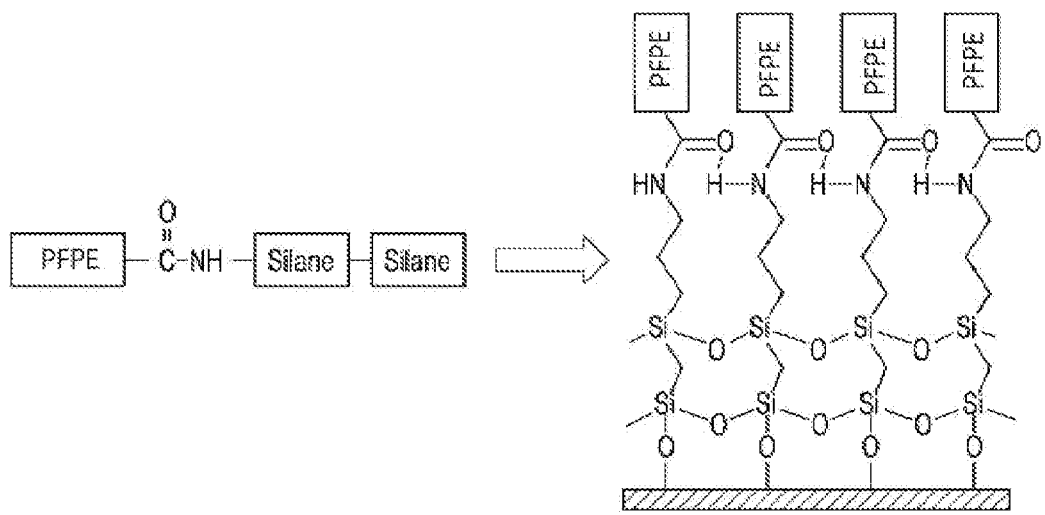
FIG. 2 is a schematic view that illustrates a structure of a film formed on a substrate using a composition according to one or more embodiments.

Referring to FIG. 2, a substrate is coated with the composition according to an embodiment including a silane compound represented by Formula 7 including a fluorine-containing (poly)ether group and thus a film is formed on the substrate. As shown in FIG. 2, the silane compound represented by Formula 7 including a fluorine-containing (poly)ether group has a perfluoro (poly)ether (PFPE) group as the fluorine-containing (poly)ether group and has a structure in which the PFPE group and a hydrolyzable silane group (shown as silane in FIG. 2) are linked by an amide bond.

In the silane compound represented by Formula 7, a weight average molecular weight of the fluorine-containing (poly)ether group may be, for example, 1,000 g/mol to 10.000 g/mol, 2,000 g/mol to 9,000 g/mol, 3,000 g/mol to 8,000 g/mol, 3,000 g/mol to 7.000 g/mol, or 3,000 g/mol to 6,000 g/mol, as determined by GPC using polystyrene standards. In the amine compound represented by Formula 2, a weight average molecular weight of the fluorine-containing (poly)ether group may be, for example, 1,000 g/mol to 10,000 g/mol, 2,000 g/mol to 9,000 g/mol, 3,000 g/mol to 8,000 g/mol, 3,000 g/mol to 7,000 g/mol, or 3,000 g/mol to 6,000 g/mol, as determined by GPC using polystyrene standards.

In the composition including the silane compound represented by Formula 7 and the amine compound represented by Formula 2, a molar ratio of the silane compound represented by Formula 7 and the amine compound represented by Formula 2 may be, for example, 1:0.01 to 1:1, 1:0.05 to 1:1, 1:0.05 to 1:0.5, 1:0.05 to 1:0.3, 1:0.05 to 1:0.2, or 1:0.05 to 1:0.15.

The composition including the silane compound represented by Formula 7 and the amine compound represented by Formula 2 may be in a liquid state or a gaseous state.

For example, the composition including the silane compound represented by Formula 7 and the amine compound represented by Formula 2 in a liquid state may be provided on to a substrate. In the composition of a liquid state, a molar ratio of the silane compound represented by Formula 7 and the amine compound represented by Formula 2 may be, for example, 1:0.05 to 1:1, 1:0.05 to 1:0.5, 1:0.05 to 1:0.3, 1:0.05 to 1:0.2, or 1:0.05 to 1:0.15.

In some embodiments, after the silane compound represented by Formula 7 and the amine compound represented by Formula 2 are each in a liquid state and prepared in separate containers, the compounds may each be evaporated and supplied to a mixing chamber through a supply line and may be mixed to obtain a composition in a gaseous state, and the composition in a gaseous state may be provided on to a substrate. A molar ratio of the composition in a gaseous state that includes the silane compound represented by Formula 7 and the amine compound represented by Formula 2 and is obtained in a mixing chamber may be, for example, 1:0.05 to 1:1, 1:0.05 to 1:0.5, 1:0.05 to 1:0.3, 1:0.05 to 1:0.2, or 1:0.05 to 1:0.15. A molar mixing ratio of the composition in a gaseous state may be determined according to supplying rates of the vaporized silane compound and the vaporized amine compound supplied to the chamber.

A pressure in the chamber may be equal to or lower than atmospheric pressure. The pressure in the chamber may be, for example, about 101325 Pa or lower, about 10000 Pa or lower, about 5000 Pa or lower, about 1000 Pa or lower, about 500 Pa or lower, about 100 Pa or lower, about 50 Pa or lower, or about 10 Pa or lower.

Film

According to another embodiment, a film includes a product prepared by hydrolysis and polycondensation of a silane compound represented by Formula 1 including a fluorine-containing (poly)ether group, an amine compound represented by Formula 2 including a fluorine-containing (poly)ether group and a product of hydrolysis and polycondensation of a silane compound represented by Formula 1 including a fluorine-containing (poly)ether group, or a product of hydrolysis and polycondensation of a silane compound represented by Formula 1 including a fluorine-containing (poly)ether group and an amine compound represented by Formula 2 including a fluorine-containing (poly)ether group. When the film includes products prepared by hydrolysis and polycondensation of the compounds disclosed herein, durability of the film may improve.

As used herein, the term "a product prepared by hydrolysis and polycondensation of a silane compound including a fluorine-containing (poly)ether group" denotes polycondensation products obtained by polycondensation of hydrolysis products, the hydrolysis products obtained from a hydrolysis reaction of a silane compound including a fluorine-containing (poly)ether group. For convenience, the product prepared by hydrolysis and polycondensation of a silane compound also may be referred to as the "hydrolysis and polycondensation product".

For example, the film may include a product prepared by hydrolysis and polycondensation of a silane compound represented by Formula 1 including a fluorine-containing (poly)ether group. The film may further include an amine compound represented by Formula 2 including a fluorine-containing (poly)ether group. A molar ratio of the hydrolysis and polycondensation products of the silane compound represented by Formula 1 including a fluorine-containing (poly)ether group and the amine compound represented by Formula 2 including a fluorine-containing (poly)ether group in the film may be, for example, 1:0.05 to 1:1, 1:0.05 to 1:0.5, 1:0.05 to 1:0.3, 1:0.05 to 1:0.2, or 1:0.05 to 1:0.15.

The film may include the silane compound represented by Formula 1 including a fluorine-containing (poly)ether group and a product prepared by the hydrolysis and polycondensation of the amine compound represented by Formula 2 including a fluorine-containing (poly)ether group. During formation of the film, the amine compound represented by Formula 2 including a fluorine-containing (poly)ether group may participate in the hydrolysis and polycondensation reaction of the silane compound represented by Formula 1 including a fluorine-containing (poly)ether group.

A thickness of the film may be, for example, about 1 micrometers (μm) or less, about 500 nanometers (nm) or less, about 100 nm or less, about 50 nm or less, about 40 nm or less, about 30 nm or less, about 20 nm or less, or about 15 nm or less. The film may be, for example, transparent.

The film may be, for example, disposed on a substrate. The film disposed on the substrate may have a structure in which a hydrolyzable silane group of the silane compound represented by Formula 1 including a fluorine-containing (poly)ether group is bound on the substrate side and a plurality of the fluorine-containing (poly)ether groups are aligned on the surface (air) side. The silane compounds including a fluorine-containing (poly)ether group may be substantially aligned along a direction perpendicular to the substrate. The film may be disposed on a substrate and may be a non-self standing film that needs a substrate.

The anti-fingerprint coating function of the film may be quantified by analyzing a water contact angle and/or a diiodomethane contact angle at room temperature, for example, at 25° C.

The contact angle of the film may be measured by using water. The film has a fluorine-containing (poly)ether group on the surface and thus may have a high contact angle. Accordingly, the film may have sufficient slip property and water repellency. The film may have, for example, a contact angle of about 100° or greater, for example, about 150° or greater, for example, about 110° or greater, or about 115° or greater. Herein, the contact angle may be measured by using a Sessile drop technique. The contact angle may be measured by using water as a liquid and a Drop Shape Analyzer (DSA100, KRUSS, Germany) and dropping a predetermined amount of (about 3 µL) water on the film.

The film may maintain a high contact angle after frequent frictions. Durability of the film may be examined through a change of the contact angle after a plurality of frictions. For example, the film may have a contact angle change of about 20° or less, about 18° or less, about 15° or less, about 12° or less, or about 10° or less after 5000 times of the abrasion test with an eraser under a load of about 1 kilogram (kg). For example, the film may have a contact angle of about 95° or greater after 1000 times of the abrasion test with an eraser under a load of about 1 kg. For example, the film may have a contact angle of about 50° or greater after 2000 times of the abrasion test with an eraser under a load of about 1 kg.

In some embodiments, a contact angle of a film may be measured by using diiodomethane. Here, for example, the contact angle may be about 90° or greater, and the film may have a contact angle within this range or, for example, may have a contact angle of about 95° or greater or about 97° or greater. Here, the contact angle may be measured by using a Sessile drop technique. The contact angle may be measured by using diiodomethane as a liquid and a Drop Shape Analyzer (DSA100, KRUSS, Germany) and dropping a predetermined amount (about 2.7 µL) of diiodomethane on the film.

Display Device

A display device according to another embodiment includes the film, wherein the film includes a product prepared by hydrolysis and polycondensation of a silane compound represented by Formula 1 including a fluorine-containing (poly)ether group, an amine compound represented by Formula 2 including a fluorine-containing (poly)ether group and a product prepared by hydrolysis and polycondensation of a silane compound represented by Formula 1 including a fluorine-containing (poly)ether group, or a product of hydrolysis and polycondensation of a silane compound represented by Formula 1 including a fluorine-containing (poly)ether group and an amine compound represented by Formula 2 including a fluorine-containing (poly) ether group. When the display device includes the film, the durability of the display device may improve.

Figure 3:
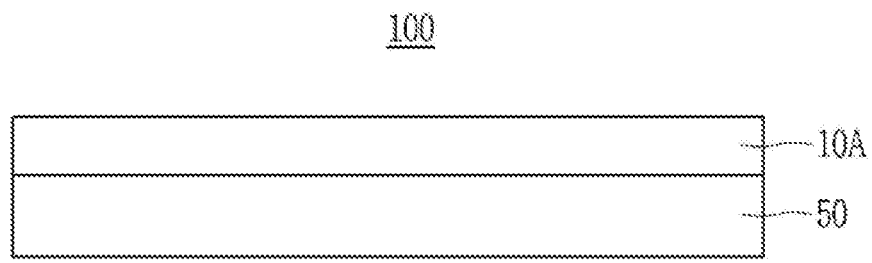
FIG. 3 is a cross-sectional view of a display device according to one or more embodiments.

Referring to FIG. 3, a display device 100 according to an embodiment includes a display panel 50 and a functional film 10A. The display panel 50 may be, for example, an organic light-emitting panel or a liquid crystal display panel. The display panel 50 may be, for example, a bendable display panel, a foldable display panel, or a Tollable display panel. The functional film 10A may include the film as disclosed herein or in a stacked structure and may be disposed on the side of an observer. Another layer may further be disposed between the display panel 50 and the functional film 10A. For example, a single layer or multiple layers of a polymer layer (not shown) and optionally a transparent adhesive layer (not shown) may further be disposed between the display panel 50 and the functional film 10A.

Figure 4:
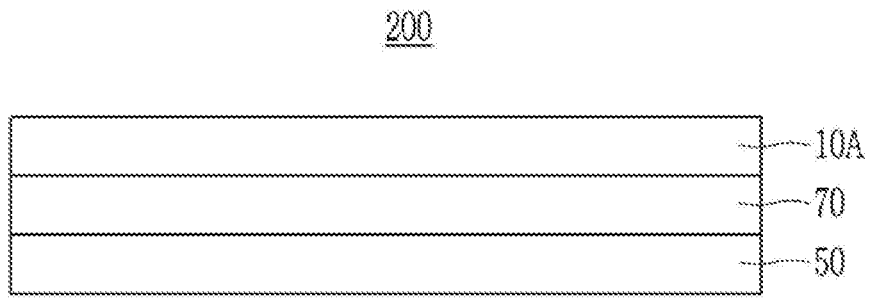
FIG. 4 is a cross-sectional view of a display device according to one or more embodiments.

Referring to FIG. 4, a display device 200 according to another embodiment includes a display panel 50, a functional film 10A, and a touch screen panel 70 disposed between the display panel 50 and the functional film 10A. The display panel 50 may be, for example, an organic light-emitting panel or a liquid crystal display panel. The display panel 50 may be, for example, a bendable display panel, a foldable display panel, or a Tollable display panel. The functional film 10A may include the film or stacked structure and may be disposed on the side of an observer.

The touch screen panel 70 may be disposed adjacent to each of the functional film 10A and the display panel 50 to recognize the touched position and the position change when is touched by a human hand or an object through the functional film 10A and then to output a touch signal. A driving module (not shown) may find a touch position from the output touch signal; recognize an icon displayed at the touched position; and control to carry out functions corresponding to the recognized icon, and the function performance results may be displayed on the display panel 50. Another layer may further be disposed between the touch screen panel 70 and the functional film 10A. For example, a single layer or multiple layers of a polymer layer (not shown) and optionally a transparent adhesive layer (not shown) may further be disposed between the touch screen panel 70 and the functional film 10A. Another layer may be disposed between the touch screen panel 70 and the display panel 50. For example, a single layer or multiple layers of a polymer layer (not shown) and optionally a transparent adhesive layer (not shown) may further be disposed between the touch screen panel 70 and the display panel 50. The functional film 10A including the film disclosed herein or in a stacked structure may be applied to a variety of electronic devices such as a display device, for example, a smart phone, a tablet PC, a camera, a touch screen panel, but embodiments are not limited thereto.

Article

According to another embodiment, an article includes a substrate; and a film layer disposed on the substrate, wherein the film layer includes a product prepared by hydrolysis and polycondensation of a silane compound represented by Formula 1 including a fluorine-containing (poly)ether group, an amine compound represented by Formula 2 including a fluorine-containing (poly)ether group and a product prepared by hydrolysis and polycondensation of a silane compound represented by Formula 1 including a fluorine-containing (poly)ether group, or a product of hydrolysis and polycondensation of a silane compound represented by Formula 1 including a fluorine-containing (poly)ether group and an amine compound represented by Formula 2 including a fluorine-containing (poly)ether group. When the article includes the film layer, durability of the article may improve.

The substrate may be, for example, ceramic, glass, or a polymer, but embodiments are not limited thereto. The film may be formed and disposed on the substrate.

The substrate and the film layer may form, for example, a stacked structure. The stacked structure may further include at least one layer between the substrate and the film layer. The stacked structure may be a transparent film or, for example, a transparent flexible film. For example, the film layer or the stacked structure may be attached on a display panel. Here, the display panel and the film layer or stacked structure may be directly attached to each other or attached to each other by applying an adhesive. The display panel may be, for example, a liquid crystal panel or an organic light-emitting panel, but embodiments are not limited thereto. The film layer or stacked structure may be disposed on the side of an observer. The article may be, for example, a mobile display device, a fixed display device, an automotive display, an aircraft display, a head-up display (HUD), a mobile sensor, a fixed sensor, or an optical article, but embodiments are not limited thereto.

According to another embodiment, a method of preparing the article includes disposing the composition on a substrate to form a film layer.

A composition including a silane compound represented by Formula 1 including a fluorine-containing (poly)ether group and an amine compound represented by Formula 2 including a fluorine-containing (poly)ether group may be provided, for example, in a liquid state or a gaseous state on to the substrate. The film layer may be formed, for example, by coating using a solution process in which the composition is provided in a liquid state or by deposition using a dry process in which the composition is provided in a gaseous state. Therefore, the film layer may be a coating film or a deposition film.

The disposing of the composition by providing the composition to a substrate may include coating and drying a solution prepared by dissolving or dispersing the composition in a solvent on the substrate by, for example, spin coating, slit coating, inkjet printing, spray coating, or impregnating. In some embodiments, the disposing of the composition by providing the composition to the substrate may include coating the substrate by thermal deposition, vacuum deposition, or chemical vapor deposition.

The solvent may be, for example, a fluorinated ether-based solvent. The fluorinated ether-based solvent may be, for example, 1,1,2,2-tetrafluoroethyl-2,2,3,3-tetrafluoropropyl ether, 1.1.2.2-tetrafluoroethyl-1H,1H,5H-octafluoropeityl ether, 1.1.2.2-tetrafluoroethyl-2,2,2-trifluoroethyl ether, or a mixture thereof, but embodiments are not limited thereto.

The method may further include disposing an interlayer on the substrate before the disposing of the composition on the substrate. The interlayer may include a metal oxide. The metal oxide may be, for example, silicon dioxide ($SiO_2$). The interlayer may be, for example, a primer layer of $SiO_2$. A thickness of the primer layer may be about 100 nm or less, about 50 nm or less, about 30 nm or less, about 20 nm or less, about 10 nm or less, or about 7 nm or less.

For example, the silane compound represented by Formula 1 including a fluorine-containing (poly)ether group may be prepared as follows.

First, an ester compound represented by Formula 8 including a fluorine-containing (poly)ether group and an amino silane compound represented by Formula 9 were mixed, and the following reaction was performed.

$Rf_a$-(L1)$_{p1}$-C(=O)—OR$_{23}$  Formula 8

NH$_2$-(L2)$_{p2}$—Si(R$_1$)(R$_2$)(R$_3$)  Formula 9

In Formulae 8 and 9, $Rf_a$ is a fluorine-containing (poly)ether group,

L1, and L2 are each independently a substituted or unsubstituted C1 to C20 alkylene group, a substituted or unsubstituted C1 to C20 oxyalkylene group, or a combination thereof, p1, and p2 are each independently an integer of 1 to 10, $R_1$, $R_2$, and $R_3$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, and $R_{23}$ is a substituted or unsubstituted C1 to C20 alkyl group, or a substituted or unsubstituted C6 to C20 aryl group, wherein at least one of $R_1$, $R_2$, and $R_3$ is a substituted or unsubstituted C1 to C20 alkoxy group, a halogen atom, or a hydroxyl group.

Although the reaction conditions may vary depending on types of the starting materials, the reaction may be performed at a temperature, for example, in a range of about 25° C. to about 70° C. or about 25° C. to about 50° C. The reaction may be, for example, performed without using an additional solvent.

An amount of the amino silane compound represented by Formula 9 may be in a range of about 1 mole (mol) to about 2 mol based on 1 mol of the ester compound represented by Formula 8 including a fluorine-containing (poly)ether group. When the amount of the amino silane compound represented by Formula 9 is about 2 mol, 1 mol of a compound represented by Formula 9 remained in the reaction mixture in addition to the silane compound represented by Formula 1 including a fluorine-containing (poly)ether group, which is a reaction product. In the reaction mixture, the amino silane compound represented by Formula 9 may be removed by using distilled water. In some embodiments, a solvent may be added to the reaction resultant without removing the amino silane compound represented by Formula 9 and use the amino silane compound in-situ in a film preparation process.

However, a method of preparing a silane compound represented by Formula 1 including a fluorine-containing (poly)ether group is not limited to the method described above, and a silane compound represented by Formula 1 including a fluorine-containing (poly)ether group may be prepared according to the selection of reactants and/or reaction conditions.

For example, the amine compound represented by Formula 2 including a fluorine-containing (poly)ether group may be prepared as follows.

First, the ester compound represented by Formula 8 including a fluorine-containing (poly)ether group is mixed with a diamine compound represented by Formula 10, and the reaction was performed.

$Rf_a$-(L1)$_{p1}$-C(=O)—OR$_{23}$  Formula 8

NH$_2$-(L4)$_{p4}$—N(R$_4$)(R$_5$)  Formula 10

In Formulae 8 and 10, $Rf_a$ is a fluorine-containing (poly)ether group,

L1, and L4 are each independently a substituted or unsubstituted C1 to C20 alkylene group, a substituted or unsubstituted C1 to C20 oxyalkylene group, or a combination thereof, p1, p2, and p4 are each independently an integer of 1 to 10, $R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group, $R_{23}$ is a substituted or unsubstituted C1 to C20 alkyl group, or a substituted or unsubstituted C6 to C20 aryl group.

Although the reaction conditions may vary depending on types of the starting materials, but the reaction may be performed at a temperature, for example, in a range of about 25° C. to about 70° C. or about 25° C. to about 50° C. The reaction may be, for example, performed without using an additional solvent.

An amount of the diamine compound represented by Formula 10 may be in a range of about 1 mol to about 2 mol based on 1 mol of the ester compound represented by Formula 8 including a fluorine-containing (poly)ether group. When the amount of the diamine compound represented by Formula 10 is about 2 mol, 1 mol of the diamine compound represented by Formula 10 is remained in the reaction mixture in addition to the silane compound represented by Formula 1 including a fluorine-containing (poly)ether group, which is a reaction product. In the reaction mixture, the diamine compound represented by Formula 10 may be removed by using distilled water. In some embodiments, a solvent may be added to the reaction resultant without removing the diamine compound represented by Formula 10 and use the diamine compound in-situ in a film preparation process.

However, a method of preparing an amine compound represented by Formula 2 including a fluorine-containing (poly)ether group is not limited to the method described above, and an amine compound represented by Formula 2 including a fluorine-containing (poly)ether group may be prepared according to the selection of reactants and/or reaction conditions.

Hereinafter, definitions of substituents used in the formulae of the present disclosure are the same as follows.

As used herein, the term "alkyl" refers to a fully saturated branched or unbranched (straight chain or linear) hydrocarbon group. The term "alkylene" refers to a divalent alkyl group.

Non-limiting examples of the alkyl group are a methyl group, an ethyl group, an n-propyl group, an isopropyl group, an n-butyl group, an isobutyl group, a sec-butyl group, an n-pentyl group, an isopentyl group, a neopentyl group, an n-hexyl group, a 3-methylhexyl group, a 2,2-dimethylpentyl group, a 2,3-dimethylpentyl group, and an n-heptyl group.

At least one hydrogen atom of the alkyl group may be substituted with a substituent selected from a halogen atom, a hydroxyl group, an alkoxy group, a nitro group, a cyano group, an amino group, an amidino group, a hydrazine, a hydrazone, a carboxyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C20 heterocycloalkyl group, or a combination thereof.

As used herein, when a definition is not otherwise provided, the term 'substituted' refers to replacement of a hydrogen atom of a group or compound by a substituent.

Examples of "a halogen atom" include fluorine, bromine, chlorine, and iodine.

As used herein, the term "alkenyl" group refers to a straight or branched chain monovalent hydrocarbon that comprises at least one carbon-carbon double bond, having the specified number of carbon atoms.

As used herein, the term "alkynyl" group refers to a straight or branched chain, monovalent hydrocarbon group having at least one carbon-carbon triple bond, having the specified number of carbon atoms.

As used herein, the term "cycloalkyl" group refers to a monovalent group that comprises one or more saturated and/or partially saturated rings in which all ring members are carbon, such as cyclopropyl, cyclobutyl, cyclopentyl, cyclohexyl, cycloheptyl, cyclooctyl, adamantyl, and partially saturated variants of the foregoing, such as cycloalkenyl groups (e.g., cyclohexenyl) or cycloalkynyl groups. As used herein, the term "cycloalkylene" group means a divalent cycloalkyl group.

As used herein, the term "alkoxy" refers to a monovalent group of the formula "alkyl-O—", where the alkyl is the same as defined above. Examples of the alkoxy group may include a methoxy group, an ethoxy group, a propoxy group, a 2-propoxy group, a butoxy group, a tert-butoxy group, a pentoxy group, a hexoxy group, a cyclopropoxy group, and a cyclohexoxy group. At least one hydrogen atom in the alkoxy group may be substituted with the same substituent as described above in connection with the alkyl group.

As used herein, the term "oxyalkylene" group means a divalent alkoxy group with the indicated number of carbon atoms attached through a carbon atom and an oxygen bridge.

As used herein, the term "aryl" is used alone or in combination, and refers to an aromatic hydrocarbon group having one or more rings.

The term "aryl" also refers to a group in which an aromatic ring is fused to one or more cycloalkyl rings. Examples of the aryl group may include a phenyl group, a naphthyl group, or a tetrahydronaphthyl group. At least one hydrogen atom of the aryl group may be substituted with the same substituent as described above in connection with the alkyl group.

Also, as used herein, when a definition is not otherwise provided, 'hetero' may refer to one including 1 to 4 heteroatoms selected from I, O, S, Se, Te, Si, and P.

Hereinafter, one or more exemplary embodiments will be described in further detail with reference to the following examples. These examples are provided for illustrative purposes only and are not intended to limit the scope of the present disclosure.

EXAMPLES

Preparation of Silane Compound Having Fluorine-Containing (Poly)ether Group

Preparation Example 1

Reaction Scheme 1

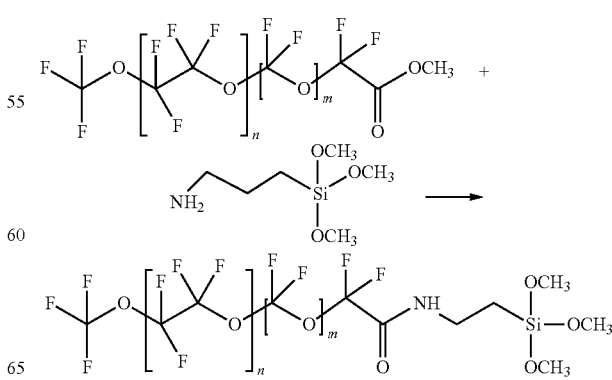

2 equivalents of 3-aminopropyl trimethoxysilane were added to 1 equivalent of perfluoro(poly)ether methylester (Mw: 5000 g/mol, n/m=1) having the above formula in a reactor equipped with a stirring and heating device, and then the reactor was sealed and heated to 45° C., followed by stirring the mixture for 3 hours. Subsequently, the unreacted materials were removed by using a rotary pump and the products by using methanol under high-temperature vacuum conditions of 80° C. and 1 Torr to obtain a silane compound (A) having a fluorine-containing (poly)ether group.

Proton nuclear magnetic resonance ($^1$H-NMR) (500 MHz, Acetone-$d_6$) δ (ppm): a peak at 3.9 ppm (3H) disappeared, and new peaks at 3.5 ppm (2H) and 2.9 ppm (2H) were observed.

Fourier Transform Infrared Spectroscopy (FTIR): an ester carbonyl peak at 1800 inverse centimeters ($cm^{-1}$) disappeared, and a new amide carbonyl peak at 1729 $cm^{-1}$ was observed.

Preparation Example 2

Reaction Scheme 2

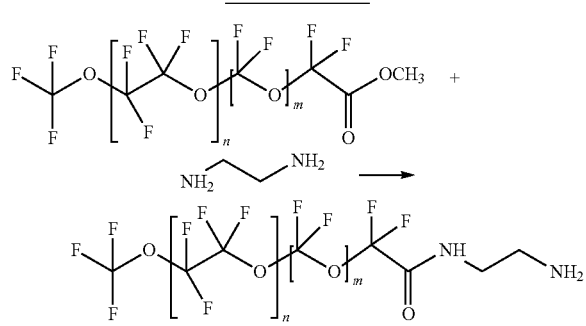

2 equivalents of ethylenediamine were added to 1 equivalent of perfluoro(poly)ether methylester (Mw: 5000 g/mol, n/m=1) having the above formula in a reactor equipped with a stirring and heating device, and then the reactor was sealed and heated to 50° C., followed by stirring the mixture for 3 hours. Subsequently, the unreacted materials were removed by using a rotary pump and the products by using methanol under high-temperature vacuum conditions of 120° C. and 1 Torr to obtain an amine compound (B) having a fluorine-containing (poly)ether group.

$^1$H-NMR (500 MHz, Acetone-$d_6$) δ (ppm): 3.6 ppm (3H), 3.4 ppm (2H), 1.8 ppm (2H), 0.7 ppm (2H).

FTIR: an ester carbonyl peak at 1800 $cm^{-1}$ disappeared, and a new amide carbonyl peak at 1729 $cm^{-1}$ was observed.
Preparation of Composition and Film Example 1: When Amount of Amine Compound (B) was 5 Mol %

The silane compound (A) having a fluorine-containing (poly)ether group prepared in Preparation Example 1 and the amine compound (B) having a fluorine-containing (poly)ether group prepared in Preparation Example 2 were mixed in a solvent, Novec-7200 (available from 3M), at a molar ratio of 0.95:0.05 to prepare a composition.

In the prepared composition, the total amount of the silane compound (A) and the amine compound (B) was about 20 parts by weight based on 100 parts by weight as the total weight of the composition.

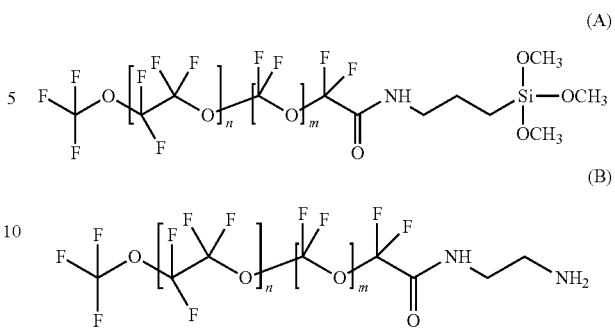

A glass substrate on which $SiO_2$ was thermally deposited at a thickness of 7 nm and a tablet impregnated with the composition were placed in a vacuum chamber. In the vacuum chamber, the solvent was evaporated, and the evaporated composition was vacuum-deposited onto the glass substrate to prepare a glass substrate on which a film layer having a thickness of 10 nm was disposed.

The evaporated silane compound (A) and amine compound (B) formed hydrolysate and/or polycondensation products on the glass substrate, thereby a film was coated on the glass substrate by a dry method.

An impregnated amount of the composition during the vacuum deposition was 0.4 grams per tablet.

Example 2: When Amount of Amine Compound (B) was 10 Mol %

A composition was prepared in the same manner as in Example 1, except that the molar ratio of the silane compound (A) and the amine compound (B) was changed to 0.90:0.10, and then the composition was used to prepare a glass substrate on which a film layer having a thickness of 10 nm was disposed.

Example 3: When Amount of Amine Compound (B) was 15 Mol %

A composition was prepared in the same manner as in Example 1, except that the molar ratio of the silane compound (A) and the amine compound (B) was changed to 0.85:0.15, and then the composition was used to prepare a glass substrate on which a film layer having a thickness of 10 nm was disposed.

Example 4: When Amount of Amine Compound (B) was 50 Mol %

A composition was prepared in the same manner as in Example 1, except that the molar ratio of the silane compound (A) and the amine compound (B) was changed to 0.85:0.15, and then the composition was used to prepare a glass substrate on which a film layer having a thickness of 10 nm was disposed.

Comparative Example 1: When Amount of Amine Compound (B) was 0 Mol %

A composition was prepared in the same manner as in Example 1, except that the molar ratio of the silane compound (A) and the amine compound (B) was changed to 1.0:0.0, and then the composition was used to prepare a glass substrate on which a film layer having a thickness of 10 nm was disposed.

That is, the amine compound (B) was not added.

Comparative Example 2: When Amount of Amino Silane Compound (C) was 5 Mol %

A composition was prepared in the same manner as in Example 1, except that an amino silane compound (C) of the following formula was used instead of the amine compound (B).

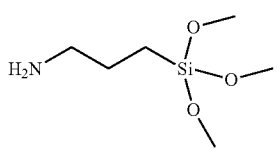

(C)

Comparative Example 3: When Amount of Amino Silane Compound (C) was 10 Mol %

A composition was prepared in the same manner as in Example 2, except that an amino silane compound (C) of the following formula was used instead of the amine compound (B).

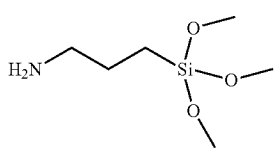

(C)

Evaluation Example 1: Storage Stability Evaluation

The compositions prepared in Examples 1 to 4 and Comparative Examples 2 and 3 were each added to a vial and stored at room temperature (about 25° C.) for 1 week and observed for phase separation to evaluate phase stability of the compositions.

The compositions of Examples 1 to 4 maintained a homogenous solution phase without phase separation for 1 week.

The compositions prepared in Comparative Examples 2 and 3 were not homogenously mixed after the preparation, and thus solutions of the compositions became turbid. That is, phase separation occurred in the solutions right after the preparation.

Phase stabilities of the compositions of Examples 1 to 4 significantly improved compared to those of the composition of Comparative Examples 2 and 3.

Thus, preservation stabilities of the compositions of Examples 1 to 4 significantly improved compared to those of the compositions of Comparative Examples 2 and 3.

Since phase separation occurred in the solutions of the compositions prepared in Comparative Examples 2 and 3, the compositions are not appropriate in preparation of a film layer having homogenous physical property.

Evaluation Example 2: Evaluation of Durability, Slip Property, and Appearance

Durability, slip property, and appearance (transparency) of the films prepared in Examples 1 to 4 and Comparative Example 1 were evaluated.

The durability of the film was evaluated by change in a contact angle due to friction.

An initial contact angle was evaluated by using a Sessile drop technique method, and a water drop was dropped on a film at a temperature of 25° C. and measured the initial contact angle by using a drop shape analyzer (model DSA100, KRUSS, Germany).

Subsequently, rubbing (10000 (10 k) times and 20000 (20 k) times) was performed by using a polyurethane rubber eraser having a weight of 1 kilogram (kg) and a width of 6 millimeters (mm). After the rubbing, a water contact angle after the rubbing at a temperature of 25° C. was measured in the same manner as in the initial contact angle.

The results of the water contact angle measurements at an initial state and after rubbing are shown in Table 1.

The slip property was evaluated by a coefficient of friction measured using a manual standard measurement method of a friction coefficient tester (model FPT-F1, LABTHINK Instrument, China) at a temperature of 25° C. The results of the friction coefficient measurement are shown in Table 1.

Also, the transparencies of the films prepared in Examples 1 to 4 and Comparative Example 1 were observed with the naked eye.

TABLE 1

| | Coefficient of Friction (COF) | Number of rubs [No.] | Initial contact angle (degree) | Contact angle after rubbing (degree) |
|---|---|---|---|---|
| Example 1 | 0.051 | 10k | 117 | 111 |
| Example 1 | 0.051 | 20k | 117 | 110 |
| Example 2 | 0.050 | 10k | 117 | 109 |
| Example 2 | 0.050 | 20k | 117 | 107 |
| Example 3 | 0.052 | 10k | 117 | 95 |
| Example 3 | 0.052 | 20k | 117 | 64 |
| Comparative Example 1 | 0.043 | 10k | 117 | 109 |
| Comparative Example 1 | 0.043 | 20k | 117 | 48 |

As shown in Table 1, the contact angles of the films prepared in Examples 1 to 3 and Comparative Example 1 after 10 k (10,000) times of rubbing were all 50 degrees or greater.

The contact angles of the films prepared in Examples 1 to 3 and Comparative Example 1 after 20 k (20,000) times of rubbing were all 50 degrees or greater, but the contact angle of the film prepared in Comparative Example 1 after 20 k times of rubbing was less than 50 degrees.

Therefore, the films prepared in Examples 1 to 3 had improved durability of with respect of friction than that of the film prepared in Comparative Example 1.

The films prepared in Examples 1 to 3 exhibited excellent slip properties of COF values of 0.1 or lower as well as the film prepared in Comparative Example 1 showed.

Although not shown in Table 1, the film prepared in Example 4 showed relatively poorer durability compared to those of the films prepared in Examples 1 to 4.

Also, the film prepared in Example 4 had relatively poorer transparency than those of the films prepared in Example 1 to 3 when observed with the naked eye.

As described above, according to one or more embodiments, when a composition includes a silane compound having a fluorine-containing (poly)ether group and an amine compound having a fluorine-containing (poly)ether group, a phase stability of the composition may improve, and durability of a film prepared by using the composition and durability of a display device and an article including the film may improve.

While this disclosure has been described in one or more embodiments with reference to the drawings, it will be understood by those of ordinary skill in the art that various changes in form and details may be made therein without departing from the spirit and scope of the following claims.

What is claimed is:

1. A composition comprising:
a silane compound represented by Formula 1 comprising a fluorine-containing (poly)ether group; and
an amine compound represented by Formula 2 comprising a fluorine-containing (poly)ether group:

$$Rf_a\text{-}(L1)_{p1}\text{-}Q1\text{-}(L2)_{p2}\text{—}Si(R_1)(R_2)(R_3) \quad \text{Formula 1}$$

$$Rf_b\text{-}(L3)_{p3}\text{-}Q2\text{-}(L4)_{p4}\text{—}N(R_4)(R_5) \quad \text{Formula 2}$$

wherein, in Formulae 1 and 2,
$Rf_a$ and $Rf_b$ are each independently the fluorine-containing (poly)ether group,
Q1 is —N($R_a$)—C(=O)O—, —C(=O)—N($R_a$)—, —N($R_a$)—S(=O)O—, —S(=O)—N($R_a$)—, —OS(=O)—N($R_a$)—C(=O)O—, or —OC(=O)—N($R_a$)—S(=O)O—,
Q2 is —N($R_b$)—C(=O)O—, —C(=O)—N($R_b$)—, —N($R_b$)—S(=O)O—, —S(=O)—N($R_b$)—, —OS(=O)—N($R_b$)—C(=O)O—, or —OC(=O)—N($R_b$)—S(=O)O—,
$R_a$ is a hydrogen, a substituted or unsubstituted C1 to C20 alkyl group, a substituted or unsubstituted C6 to C20 aryl group, or -(L5)$_{p5}$—Si($R_7$)($R_8$)($R_9$),
$R_b$ is a hydrogen, a substituted or unsubstituted C1 to C20 alkyl group, a substituted or unsubstituted C6 to C20 aryl group, or -(L6)$_{p6}$—N($R_{11}$)($R_{12}$),
L1, L2, L3, L4, L5, and L6 are each independently a substituted or unsubstituted C1 to C20 alkylene group, a substituted or unsubstituted C1 to C20 oxyalkylene group, or a combination thereof,
p1, p2, p3, p4, p5, and p6 are each independently an integer of 1 to 10,
$R_1$, $R_2$, $R_3$, $R_7$, $R_8$, and $R_9$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group,
$R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group,
wherein at least one of Ru, $R_2$, and $R_3$ is a substituted or unsubstituted C1 to C20 alkoxy group, a halogen atom, or a hydroxyl group; and at least one of $R_7$, $R_8$, and $R_9$ is a substituted or unsubstituted C1 to C20 alkoxy group, a halogen atom, or a hydroxyl group.

2. The composition of claim 1, wherein $Rf_a$ and $Rf_b$ are each independently a perfluoro(poly)ether group.

3. The composition of claim 1, wherein
the fluorine-containing (poly)ether group has a $CF_3(CF_2)_h$O— group at a terminal end, wherein a —($CF_2CF_2$O)$_i$— group, a —($CF_2$O)$_j$— group, and a —($CH_2$O)$_k$— group are each bound directly or indirectly to the $CF_3(CF_2)_h$O— group, and
h and k are each independently an integer of 0 to 10, and i and j are each independently an integer of 1 to 100.

4. The composition of claim 1, wherein $Rf_a$ and $Rf_b$ are each independently
$CF_3$O—($CF_2CF_2$O)$_i$—($CF_2$O)$_j$—($CH_2$O)$_k$—,
$CF_3$O—($CF_2$O)$_j$—($CF_2CF_2$O)$_i$—($CH_2$O)$_k$—,
$CF_3CF_2$O—($CF_2CF_2$O)$_i$—($CF_2$O)$_j$—($CH_2$O)$_k$—,
$CF_3CF_2$O—($CF_2$O)$_j$—($CF_2CF_2$O)$_i$—($CH_2$O)$_k$—,
$CF_3CF_2CF_2$O—($CF_2CF_2$O)$_i$—($CF_2$O)$_j$—($CH_2$O)$_k$—,
or
$CF_3CF_2CF_2$O—($CF_2$O)$_j$—($CF_2CF_2$O)$_i$—($CH_2$O)$_k$—,
wherein k is an integer of 0 to 10, and i and j are each independently an integer of 1 to 100.

5. The composition of claim 1, wherein the silane compound of Formula 1 is represented by one of Formulae 3 and 4:

$$CF_3(CF_2)_hO(CF_2CF_2O)_i(CF_2O)_j(CH_2O)_k\text{—}(CR_{13}R_{14})_{p1}\text{—}C(=O)\text{—}NH\text{—}(CH_2)_{p2}\text{—}Si(R_1)(R_2)(R_3) \quad \text{Formula 3}$$

$$CF_3(CF_2)_hO\text{—}(CF_2CF_2O)_i\text{—}(CF_2O)_j\text{—}(CH_2O)_k\text{—}(CR_{13}R_{14})_{p1}\text{—}C(=O)\text{—}N((CH_2)_{p2}\text{—}Si(R_1)(R_2)(R_3))((CH_2)_{p5}\text{—}Si(R_7)(R_8)(R_9)) \quad \text{Formula 4}$$

wherein, in Formulae 3 and 4,
$R_{13}$ and $R_{14}$ are each independently a hydrogen, a C1-C5 alkyl group, a fluorine, or a fluorinated C1-C5 alkyl group,
p1, p2, and p5 are each independently an integer of 1 to 10,
h and k are each independently an integer of 0 to 10, and i and j are each independently an integer of 1 to 100,
$R_1$, $R_2$, $R_3$, $R_7$, $R_8$, and $R_9$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group,
wherein at least one of $R_1$, $R_2$, and $R_3$ is a substituted or unsubstituted C1 to C20 alkoxy group, a halogen atom, or a hydroxyl group; and at least one of $R_7$, $R_8$, and $R_9$ is a substituted or unsubstituted C1 to C20 alkoxy group, a halogen atom, or a hydroxyl group.

6. The composition of claim 1, wherein the amine compound comprising a fluorine-containing (poly)ether group is represented by Formula 2; and the amine compound comprising a fluorine-containing (poly)ether group is represented by one of Formulae 5 and 6:

$$CF_3(CF_2)_hO(CF_2CF_2O)_i(CF_2O)_j(CH_2O)_k\text{—}(CR_{15}R_{16})_{p3}\text{—}C(=O)\text{—}NH\text{—}(CH_2)_{p4}\text{—}N(R_4)(R_5) \quad \text{Formula 5}$$

$$CF_3(CF_2)_hO(CF_2CF_2O)_i(CF_2O)_j(CH_2O)_k\text{—}(CR_{15}R_{16})_{p3}\text{—}C(=O)\text{—}N((CH_2)_{p4}\text{—}N(R_4)(R_5))((CH_2)_{p6}\text{—}N(R_{11})(R_{12})) \quad \text{Formula 6}$$

wherein, in Formulae 5 and 6,
$R_{15}$ and $R_{16}$ are each independently a hydrogen, a C1-C5 alkyl group, a fluorine, or a fluorinated C1-C5 alkyl group,
p3, p4, and p6 are each independently an integer of 1 to 10,
h and k are each independently an integer of 0 to 10, i and j are each independently an integer of 1 to 100, and
$R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group.

7. The composition of claim 1, wherein the silane compound represented by Formula 1 is
CF$_3$O(CF$_2$CF$_2$O)$_i$(CF$_2$O)$_j$—(CH$_2$)—C(=O)NH—(CH$_2$)$_2$—Si(OCH$_3$)(OCH$_3$)(OCH$_3$), CF$_3$O(CF$_2$CF$_2$O)$_i$(CF$_2$O)$_j$—(CH$_2$OCH$_2$)—C(=O)NH—(CH$_2$)$_2$—Si(OCH$_3$)(OCH$_3$)(OCH$_3$), CF$_3$O(CF$_2$CF$_2$O)$_i$(CF$_2$O)$_j$—(CF$_2$)—C(=O)NH—(CH$_2$)$_2$—Si(OCH$_3$)(OCH$_3$)(OCH$_3$), CF$_3$O(CF$_2$CF$_2$O)$_i$(CF$_2$O)$_j$—(CH$_2$)—C(=O)NH—(CH$_2$)$_2$—Si(OCH$_3$)(OCH$_3$)(CH$_3$), CF$_3$O(CF$_2$CF$_2$O)(CF$_2$O)$_j$—(CH$_2$OCH$_2$)—C(=O)NH—(CH$_2$)$_2$—Si(OCH$_3$)(OCH$_3$)(CH$_3$), CF$_3$O(CF$_2$CF$_2$O)$_i$(CF$_2$O)$_j$—(CF$_2$)—C(=O)NH—(CH$_2$)$_2$—Si(OCH$_3$)(OCH$_3$)(CH$_3$), CF$_3$CF$_2$O(CF$_2$CF$_2$O)$_i$(CF$_2$C)—(CH$_2$)—C(=O)NH—(CH$_2$)$_2$—Si(OCH$_3$)(OCH$_3$)(OCH$_3$), CF$_3$CF$_2$O(CF$_2$CF$_2$O)$_i$(CF$_2$O)$_j$—(CH$_2$OCH$_2$)—C(=O)NH—(CH$_2$)$_2$—Si(OCH$_3$)(OCH$_3$)(OCH$_3$), CF$_3$CF$_2$O(CF$_2$CF$_2$O)$_i$(CF$_2$O)$_j$—(CF$_2$)—C(=O)NH—(CH$_2$)$_2$—Si(OCH$_3$)(OCH$_3$)(OCH$_3$), CF$_3$CF$_2$O(CF$_2$CF$_2$O)$_i$(CF$_2$O)$_j$—(CH$_2$)—C(=O)NH—(CH$_2$)$_2$—Si(OCH$_3$)(OCH$_3$)(CH$_3$), CF$_3$CF$_2$O(CF$_2$CF$_2$O)$_i$(CF$_2$O)$_j$—(CH$_2$OCH$_2$)—C(=O)NH—(CH$_2$)$_2$—Si(OCH$_3$)(OCH$_3$)(CH$_3$), CF$_3$CF$_2$O(CF$_2$CF$_2$O)$_i$(CF$_2$O)$_j$—(CF$_2$)—C(=O)NH—(CH$_2$)$_2$—Si(OCH$_3$)(OCH$_3$)(CH$_3$), CF$_3$CF$_2$CF$_2$O(CF$_2$CF$_2$O)(CF$_2$O)$_j$—(CH$_2$)—C(=O)NH—(CH$_2$)$_2$—Si(OCH$_3$)(OCH$_3$)(OCH$_3$), CF$_3$CF$_2$CF$_2$O(CF$_2$CF$_2$O)$_i$(CF$_2$O)$_j$—(CH$_2$OCH$_2$)—C(=O)NH—(CH$_2$)$_2$—Si(OCH$_3$)(OCH$_3$)(OCH$_3$), CF$_3$CF$_2$CF$_2$O(CF$_2$CF$_2$O)$_i$(CF$_2$O)$_j$—(CF$_2$)—C(=O)NH—(CH$_2$)$_2$—Si(OCH$_3$)(OCH$_3$)(OCH$_3$), CF$_3$CF$_2$CF$_2$O(CF$_2$CF$_2$O)$_i$(CF$_2$O)$_j$—(CH$_2$)—C(=O)NH—(CH$_2$)$_2$—Si(OCH$_3$)(OCH$_3$)(CH$_3$), CF$_3$CF$_2$CF$_2$O(CF$_2$CF$_2$O)$_i$(CF$_2$O)$_j$—(CH$_2$OCH$_2$)—C(=O)NH—(CH$_2$)$_2$—Si(OCH$_3$)(OCH$_3$)(CH$_3$), CF$_3$CF$_2$CF$_2$O(CF$_2$CF$_2$O)$_i$(CF$_2$O)$_j$—(CF$_2$)—C(=O)NH—(CH$_2$)$_2$—Si(OCH$_3$)(OCH$_3$)(CH$_3$), CF$_3$O(CF$_2$CF$_2$O)$_i$(CF$_2$O)$_j$—(CH$_2$)—C(=O)N(—(CH$_2$)$_2$—Si(OCH$_3$)(OCH$_3$)(OCH$_3$))$_2$, CF$_3$O(CF$_2$CF$_2$O)$_i$(CF$_2$O)$_j$—(CH$_2$OCH$_2$)—C(=O)N(—(CH$_2$)$_2$—Si(OCH$_3$)(OCH$_3$)(OCH$_3$))$_2$, CF$_3$O(CF$_2$CF$_2$O)$_i$(CF$_2$O)$_j$—(CF$_2$)—C(=O)N(—(CH$_2$)$_2$—Si(OCH$_3$)(OCH$_3$)(OCH$_3$))$_2$, CF$_3$O(CF$_2$CF$_2$O)$_i$(CF$_2$O)$_j$—(CH$_2$)—C(=O)N(—(CH$_2$)$_2$—Si(OCH$_3$)(OCH$_3$)(CH$_3$))$_2$, CF$_3$O(CF$_2$CF$_2$O)$_i$(CF$_2$O)$_j$—(CH$_2$OCH$_2$)—C(=O)N(—(CH$_2$)$_2$—Si(OCH$_3$)(OCH$_3$)(CH$_3$))$_2$, CF$_3$O(CF$_2$CF$_2$O)$_i$(CF$_2$O)$_j$—(CF$_2$)—C(=O)N(—(CH$_2$)$_2$—Si(OCH$_3$)(OCH$_3$)(CH$_3$))$_2$, CF$_3$CF$_2$O(CF$_2$CF$_2$O)$_i$(CF$_2$O)$_j$—(CH$_2$)—C(=O)N(—(CH$_2$)$_2$—Si(OCH$_3$)(OCH$_3$)(OCH$_3$))$_2$, CF$_3$CF$_2$O(CF$_2$CF$_2$O)$_i$(CF$_2$O)$_j$—(CH$_2$OCH$_2$)—C(=O)N(—(CH$_2$)$_2$—Si(OCH$_3$)(OCH$_3$)(OCH$_3$))$_2$, CF$_3$CF$_2$O(CF$_2$CF$_2$O)$_i$(CF$_2$O)$_j$—(CF$_2$)—C(=O)N(—(CH$_2$)$_2$—Si(OCH$_3$)(OCH$_3$)(OCH$_3$))$_2$, CF$_3$CF$_2$O(CF$_2$CF$_2$O)$_i$(CF$_2$O)$_j$—(CH$_2$)—C(=O)N(—(CH$_2$)$_2$—Si(OCH$_3$)(OCH$_3$)(CH$_3$))$_2$, CF$_3$CF$_2$O(CF$_2$CF$_2$O)$_i$(CF$_2$O)$_j$—(CH$_2$OCH$_2$)—C(=O)N(—(CH$_2$)$_2$—Si(OCH$_3$)(OCH$_3$)(CH$_3$))$_2$, CF$_3$CF$_2$O(CF$_2$CF$_2$O)$_i$(CF$_2$O)$_j$—(CF$_2$)—C(=O)N(—(CH$_2$)$_2$—Si(OCH$_3$)(OCH$_3$)(CH$_3$))$_2$, CF$_3$CF$_2$CF$_2$O(CF$_2$CF$_2$O)$_i$(CF$_2$O)$_j$—(CH$_2$)—C(=O)N(—(CH$_2$)$_2$—Si(OCH$_3$)(OCH$_3$)(OCH$_3$))$_2$, CF$_3$CF$_2$CF$_2$O(CF$_2$CF$_2$O)$_i$(CF$_2$O)$_j$—(CH$_2$OCH$_2$)—C(=O)N(—(CH$_2$)$_2$—Si(OCH$_3$)(OCH$_3$)(OCH$_3$))$_2$, CF$_3$CF$_2$CF$_2$O(CF$_2$CF$_2$O)$_i$(CF$_2$O)$_j$—(CF$_2$)—C(=O)N(—(CH$_2$)$_2$—Si(OCH$_3$)(OCH$_3$)(OCH$_3$))$_2$, CF$_3$CF$_2$CF$_2$O(CF$_2$CF$_2$O)$_i$(CF$_2$O)$_j$—(CH$_2$)—C(=O)N(—(CH$_2$)$_2$—Si(OCH$_3$)(OCH$_3$)(CH$_3$))$_2$, CF$_3$CF$_2$CF$_2$O(CF$_2$CF$_2$O)$_i$(CF$_2$O)$_j$—(CH$_2$OCH$_2$)—C(=O)N(—(CH$_2$)$_2$—Si(OCH$_3$)(OCH$_3$)(CH$_3$))$_2$, or CF$_3$CF$_2$CF$_2$O(CF$_2$CF$_2$O)$_i$(CF$_2$C$_4$—(CF$_2$)—C(=C)N(—(CH$_2$)$_2$—Si(OCH$_3$)(OCH$_3$)(CH$_3$))$_2$, and i and j are each independently an integer of 1 to 100.

8. The composition of claim 1, wherein the amine compound represented by Formula 2 is
CF$_3$O(CF$_2$CF$_2$O)(CF$_2$O)$_j$—(CH$_2$)—C(=O)NH—(CH$_2$)$_2$—NH$_2$, CF$_3$O(CF$_2$CF$_2$O)$_i$(CF$_2$O)$_j$—(CH$_2$OCH$_2$)—C(=O)NH—(CH$_2$)$_2$—NH$_2$, CF$_3$O(CF$_2$CF$_2$O)$_i$(CF$_2$O)$_j$—(CF$_2$)—C(=O)NH—(CH$_2$)$_2$—NH$_2$, CF$_3$O(CF$_2$CF$_2$O)$_N$(CF$_2$O)$_j$—(CH$_2$)—C(=O)NH—(CH$_2$)$_2$—NHCH$_3$, CF$_3$O(CF$_2$CF$_2$O)$_i$(CF$_2$O)$_j$—(CH$_2$OCH$_2$)—C(=O)NH—(CH$_2$)$_2$—NHCH$_3$, CF$_3$O(CF$_2$CF$_2$O)$_i$(CF$_2$O)$_j$—(CF$_2$)—C(=O)NH—(CH$_2$)$_2$—NHCH$_3$, CF$_3$O(CF$_2$CF$_2$O)$_i$(CF$_2$O)$_j$—(CH$_2$)—C(=O)NH—(CH$_2$)$_2$—N(CH$_3$)$_2$, CF$_3$O(CF$_2$CF$_2$O)$_i$(CF$_2$O)$_j$—(CH$_2$OCH$_2$)—C(=O)NH—(CH$_2$)$_2$—N(CH$_3$)$_2$, CF$_3$O(CF$_2$CF$_2$O)$_i$(CF$_2$O)$_j$—(CF$_2$)—C(=O)NH—(CH$_2$)$_2$—N(CH$_3$)$_2$, CF$_3$CF$_2$O(CF$_2$CF$_2$O)$_i$(CF$_2$O)$_j$—(CH$_2$)—C(=O)NH—(CH$_2$)$_2$—NH$_2$, CF$_3$CF$_2$O(CF$_2$CF$_2$O)$_i$(CF$_2$O)$_j$—(CH$_2$OCH$_2$)—C(=O)NH—(CH$_2$)$_2$—NH$_2$, CF$_3$CF$_2$O(CF$_2$CF$_2$O)$_i$(CF$_2$O)$_j$—(CF$_2$)—C(=O)NH—(CH$_2$)$_2$—NH$_2$, CF$_3$CF$_2$O(CF$_2$CF$_2$O)(CF$_2$O)$_j$—(CH$_2$)—C(=O)NH—(CH$_2$)$_2$—NHCH$_3$, CF$_3$CF$_2$O(CF$_2$CF$_2$O)$_i$(CF$_2$O)$_j$—(CH$_2$OCH$_2$)—C(=O)NH—(CH$_2$)$_2$—NHCH$_3$, CF$_3$CF$_2$O(CF$_2$CF$_2$O)$_i$(CF$_2$O)$_j$—(CF$_2$)—C(=O)NH—(CH$_2$)$_2$—NHCH$_3$, CF$_3$CF$_2$O(CF$_2$CF$_2$O)$_i$(CF$_2$O)$_j$—(CH$_2$)—C(=O)NH—(CH$_2$)$_2$—N(CH$_3$)$_2$, CF$_3$CF$_2$O(CF$_2$CF$_2$O)$_i$(CF$_2$O)$_j$—(CH$_2$OCH$_2$)—C(=O)NH—(CH$_2$)$_2$—N(CH$_3$)$_2$, CF$_3$CF$_2$O(CF$_2$CF$_2$O)$_i$(CF$_2$O)$_j$—(CF$_2$)—C(=O)NH—(CH$_2$)$_2$—N(CH$_3$)$_2$, CF$_3$CF$_2$O(CF$_2$CF$_2$O)$_i$(CF$_2$O)$_j$—(CH$_2$)—C(=O)NH—(CH$_2$)$_2$—NH$_2$, CF$_3$CF$_2$CF$_2$O(CF$_2$CF$_2$O)$_i$(CF$_2$O)$_j$—(CH$_2$OCH$_2$)—C(=O)NH—(CH$_2$)$_2$—NH$_2$, CF$_3$CF$_2$CF$_2$O(CF$_2$CF$_2$O)$_i$(CF$_2$O)$_j$—(CF$_2$)—C(=O)NH—(CH$_2$)$_2$—NH$_2$, CF$_3$CF$_2$CF$_2$O(CF$_2$CF$_2$O)$_i$(CF$_2$O)$_j$—(CH$_2$)—C(=O)NH—(CH$_2$)$_2$—NHCH$_3$, CF$_3$CF$_2$CF$_2$O(CF$_2$CF$_2$O)$_i$(CF$_2$O)$_j$—(CH$_2$OCH$_2$)—C(=O)NH—(CH$_2$)$_2$—NHCH$_3$, CF$_3$CF$_2$CF$_2$O(CF$_2$CF$_2$O)$_i$(CF$_2$O)$_j$—(CF$_2$)—C(=O)NH—(CH$_2$)$_2$—NHCH$_3$, CF$_3$CF$_2$CF$_2$O(CF$_2$CF$_2$O)$_i$(CF$_2$O)$_j$—(CH$_2$)—C(=O)NH—(CH$_2$)$_2$—N(CH$_3$)$_2$, CF$_3$CF$_2$CF$_2$O(CF$_2$CF$_2$O)$_i$(CF$_2$O)$_j$—(CH$_2$OCH$_2$)—C(=O)NH—(CH$_2$)$_2$—N(CH$_3$)$_2$, CF$_3$CF$_2$CF$_2$O(CF$_2$CF$_2$O)$_i$(CF$_2$O)$_j$—(CF$_2$)—C(=O)NH—(CH$_2$)$_2$—N(CH$_3$)$_2$, CF$_3$O(CF$_2$CF$_2$O)$_i$(CF$_2$O)$_j$—(CH$_2$)—C(=O)N(—(CH$_2$)$_2$—NH$_2$)$_2$, CF$_3$O(CF$_2$CF$_2$O)$_i$(CF$_2$O)$_j$—(CH$_2$OCH$_2$)—C(=O)N(—(CH$_2$)$_2$—NH$_2$)$_2$, CF$_3$O(CF$_2$CF$_2$O)$_i$(CF$_2$O)$_j$—(CF$_2$)—C(=O)N(—(CH$_2$)$_2$—NH$_2$)$_2$, CF$_3$O(CF$_2$CF$_2$O)$_i$(CF$_2$O)$_j$(CH$_2$)—C(=O)N(—(CH$_2$)$_2$—NHCH$_3$)$_2$, CF$_3$O(CF$_2$CF$_2$O)$_i$(CF$_2$O)$_j$—(CH$_2$OCH$_2$)—C(=O)N(—(CH$_2$)$_2$—NHCH$_3$)$_2$, CF$_3$O(CF$_2$CF$_2$O)$_i$(CF$_2$O)$_j$—(CF$_2$)—C(=O)N(—(CH$_2$)$_2$—NHCH$_3$)$_2$, CF$_3$O(CF$_2$CF$_2$O)$_i$(CF$_2$O)$_j$—(CH$_2$)—C(=O)N(—(CH$_2$)$_2$—N(CH$_3$)$_2$)$_2$, CF$_3$O(CF$_2$CF$_2$O)$_i$(CF$_2$O)$_j$—(CH$_2$OCH$_2$)—C(=O)N(—(CH$_2$)$_2$—N(CH$_3$)$_2$)$_2$, CF$_3$O(CF$_2$CF$_2$O)$_i$(CF$_2$O)$_j$—(CF$_2$)—C(=O)N(—(CH$_2$)$_2$—N(CH$_3$)$_2$)$_2$, CF$_3$CF$_2$O(CF$_2$CF$_2$O)$_i$(CF$_2$O)$_j$—(CH$_2$)—C(=O)N(—(CH$_2$)$_2$—NH$_2$)$_2$, CF$_3$CF$_2$O(CF$_2$CF$_2$O)$_i$(CF$_2$O)$_j$—(CH$_2$OCH$_2$)—C(=O)N(—(CH$_2$)$_2$—NH$_2$)$_2$, CF$_3$CF$_2$O(CF$_2$CF$_2$O)$_i$(CF$_2$O)$_j$—(CF$_2$)—C(=O)N(—(CH$_2$)$_2$—NH$_2$)$_2$, CF$_3$CF$_2$O(CF$_2$CF$_2$O)$_i$(CF$_2$O)$_j$—(CH$_2$)—C(=O)N(—(CH$_2$)$_2$—NHCH$_3$)$_2$, CF$_3$CF$_2$O(CF$_2$CF$_2$O)$_i$(CF$_2$O)$_j$—(CH$_2$OCH$_2$)—C(=O)N(—(CH$_2$)$_2$—N(CH$_3$)$_2$, CF$_3$CF$_2$O(CF$_2$CF$_2$O)$_i$(CF$_2$O)$_j$—(CF$_2$)—C(=O)N(—(CH$_2$)$_2$—NHCH$_3$)$_2$, CF$_3$CF$_2$O (CF₂CF₂O)ᵢ(CF₂O)ⱼ—(CH₂)—C(=O)N(—(CH₂)₂—N(CH₃)₂)₂, CF₃CF₂O(CF₂CF₂O)ᵢ(CF₂O)ⱼ—(CH₂OCH₂)—C(=O)N(—(CH₂)₂—N(CH₃)₂)₂, CF₃CF₂O(CF₂CF₂O)ᵢ(CF₂O)ⱼ—(CF₂)—C(=O)N(—(CH₂)₂—N(CH₃)₂)₂, CF₃CF₂CF₂O(CF₂CF₂O)ᵢ(CF₂O)ⱼ—(CH₂)—C(=O)N(—(CH₂)₂—NH₂)₂, CF₃CF₂CF₂O(CF₂CF₂O)(CF₂O)ⱼ—(CH₂OCH₂)—C(=O)N—(CH₂)₂—NH₂)₂, CF₃CF₂CF₂O(CF₂CF₂O)ᵢ(CF₂O)ⱼ—(CF₂)—C(=O)N(—(CH₂)₂—NH₂)₂, CF₃CF₂CF₂O(CF₂CF₂O)ᵢ(CF₂O)ⱼ—(CH₂)—C(=O)N(—(CH₂)₂—NHCH₃)₂, CF₃CF₂CF₂O(CF₂CF₂O)ᵢ(CF₂O)ⱼ—(CH₂OCH₂)—C(=O)N(—(CH₂)₂—NHCH₃)₂, CF₃CF₂CF₂O(CF₂CF₂O)ᵢ(CF₂O)ⱼ—(CF₂)—C(=O)N(—(CH₂)₂—NHCH₃)₂, CF₃CF₂CF₂O(CF₂CF₂O)ᵢ(CF₂O)ⱼ—(CH₂)—C(=O)N(—(CH₂)₂—N(CH₃)₂)₂, CF₃CF₂CF₂O(CF₂CF₂O)ᵢ(CF₂O)ⱼ—(CH₂OCH₂)—C(=O)N(—(CH₂)₂—N(CH₃)₂)₂, or CF₃CF₂CF₂O(CF₂CF₂O)ᵢ(CF₂O)ⱼ—(CF₂)—C(=O)N(—(CH₂)₂—N(CH₃)₂)₂, and i and j are each independently an integer of 1 to 100.

9. The composition of claim 1, wherein the silane compound represented by Formula 1 and the amine compound represented by Formula 2 each independently comprises a fluorine-containing (poly)ether group having a weight average molecular weight in a range of about 1,000 grams per mole to about 10,000 grams per mole.

10. The composition of claim 1, wherein a molar ratio of the silane compound represented by Formula 1 and the amine compound represented by Formula 2 is in a range of about 1:0.05 to about 1:1.

11. The composition of claim 1, wherein the composition is in a liquid state or a gas state.

12. A composition comprising an amine compound comprising a fluorine-containing (poly)ether group is represented by Formula 2:

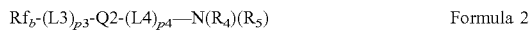

Rf_b-(L3)_{p3}-Q2-(L4)_{p4}—N(R_4)(R_5)    Formula 2 wherein, in Formula 2,

Rf_b is a fluorine-containing (poly)ether group,

Q2 is —N(R_b)—C(=O)O—, —C(=O)—N(R_b)—, —N(R_b)—S(=O)O—, —S(=O)—N(R_b)—, —OS(=O)—N(R_b)—C(=O)O—, or —OC(=O)—N(R_b)—S(=O)O—,

R_b is a hydrogen, a substituted or unsubstituted C1 to C20 alkyl group, a substituted or unsubstituted C6 to C20 aryl group, or -(L6)_{p6}—N(R_{11})(R_{12}), L3, L4, and L6 are each independently a substituted or unsubstituted C1 to C20 alkylene group, a substituted or unsubstituted C1 to C20 oxyalkylene group, or a combination thereof, p3, p4, and p6 are each independently an integer of 1 to 10, and R_4, R_5, R_{10}, R_{11}, and R_{12} are each independently a hydrogen, a substituted or unsubstituted C1 to C20 alkyl group, or a substituted or unsubstituted C6 to C20 aryl group.

13. The composition of claim 12, wherein the amine compound represented by Formula 2 is an amine compound represented by one of Formulae 5 and 6:

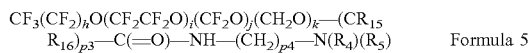

CF₃(CF₂)_hO(CF₂CF₂O)ᵢ(CF₂O)ⱼ(CH₂O)_k—(CR_{15}R_{16})_{p3}—C(=O)—NH—(CH₂)_{p4}—N(R_4)(R_5)    Formula 5

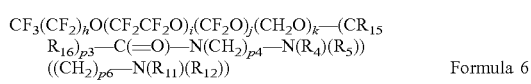

CF₃(CF₂)_hO(CF₂CF₂O)ᵢ(CF₂O)ⱼ(CH₂O)_k—(CR_{15}R_{16})_{p3}—C(=O)—N(CH₂)_{p4}—N(R_4)(R_5))((CH₂)_{p6}—N(R_{11})(R_{12}))    Formula 6 wherein, in Formulae 5 and 6,

R_{15} and R_{16} are each independently a hydrogen, a C1-C5 alkyl group, a fluorine, or a fluorinated C1-C5 alkyl group, p3, p4, and p6 are each independently an integer of 1 to 10, h and k are each independently an integer of 0 to 10, i and j are each independently an integer of 1 to 100, and R_4, R_5, R_{10}, R_{11}, and R_{12} are each independently a hydrogen, a substituted or unsubstituted C1 to C20 alkyl group, or a substituted or unsubstituted C6 to C20 aryl group.

14. The composition of claim 12, wherein the amine compound represented by Formula 2 comprising a fluorine-containing (poly)ether group is

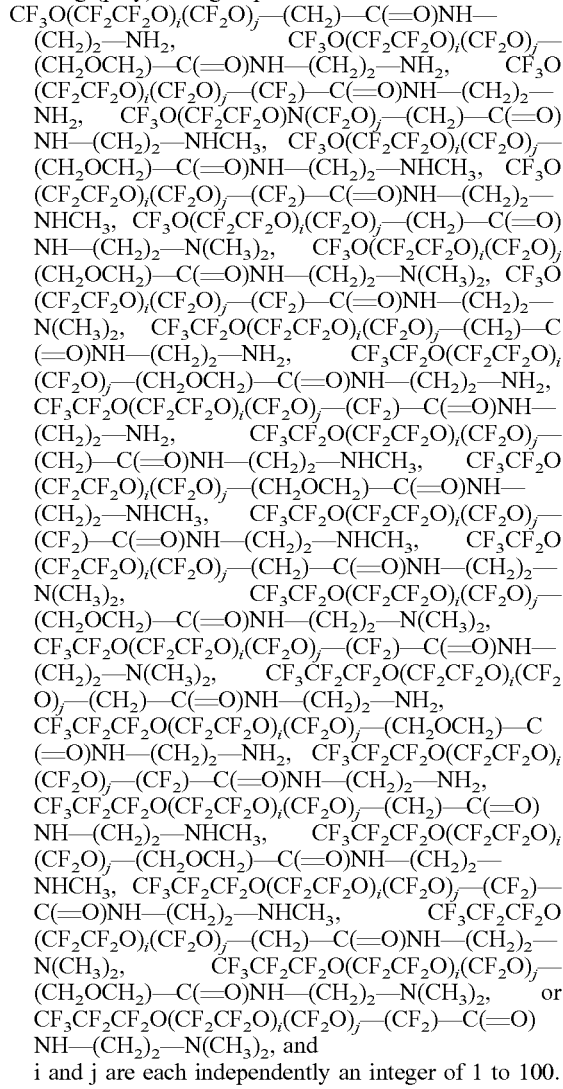

CF₃O(CF₂CF₂O)ᵢ(CF₂O)ⱼ—(CH₂)—C(=O)NH—(CH₂)₂—NH₂, CF₃O(CF₂CF₂O)ᵢ(CF₂O)ⱼ—(CH₂OCH₂)—C(=O)NH—(CH₂)₂—NH₂, CF₃O(CF₂CF₂O)ᵢ(CF₂O)ⱼ—(CF₂)—C(=O)NH—(CH₂)₂—NH₂, CF₃O(CF₂CF₂O)ᵢ(CF₂O)ⱼ—(CH₂)—C(=O)NH—(CH₂)₂—NHCH₃, CF₃O(CF₂CF₂O)ᵢ(CF₂O)ⱼ—(CH₂OCH₂)—C(=O)NH—(CH₂)₂—NHCH₃, CF₃O(CF₂CF₂O)ᵢ(CF₂O)ⱼ—(CF₂)—C(=O)NH—(CH₂)₂—NHCH₃, CF₃O(CF₂CF₂O)ᵢ(CF₂O)ⱼ—(CH₂)—C(=O)NH—(CH₂)₂—N(CH₃)₂, CF₃O(CF₂CF₂O)ᵢ(CF₂O)ⱼ—(CH₂OCH₂)—C(=O)NH—(CH₂)₂—N(CH₃)₂, CF₃O(CF₂CF₂O)ᵢ(CF₂O)ⱼ—(CF₂)—C(=O)NH—(CH₂)₂—N(CH₃)₂, CF₃CF₂O(CF₂CF₂O)ᵢ(CF₂O)ⱼ—(CH₂)—C(=O)NH—(CH₂)₂—NH₂, CF₃CF₂O(CF₂CF₂O)ᵢ(CF₂O)ⱼ—(CH₂OCH₂)—C(=O)NH—(CH₂)₂—NH₂, CF₃CF₂O(CF₂CF₂O)ᵢ(CF₂O)ⱼ—(CF₂)—C(=O)NH—(CH₂)₂—NH₂, CF₃CF₂O(CF₂CF₂O)ᵢ(CF₂O)ⱼ—(CH₂)—C(=O)NH—(CH₂)₂—NHCH₃, CF₃CF₂O(CF₂CF₂O)ᵢ(CF₂O)ⱼ—(CH₂OCH₂)—C(=O)NH—(CH₂)₂—NHCH₃, CF₃CF₂O(CF₂CF₂O)ᵢ(CF₂O)ⱼ—(CF₂)—C(=O)NH—(CH₂)₂—NHCH₃, CF₃CF₂O(CF₂CF₂O)ᵢ(CF₂O)ⱼ—(CH₂)—C(=O)NH—(CH₂)₂—N(CH₃)₂, CF₃CF₂O(CF₂CF₂O)ᵢ(CF₂O)ⱼ—(CH₂OCH₂)—C(=O)NH—(CH₂)₂—N(CH₃)₂, CF₃CF₂O(CF₂CF₂O)ᵢ(CF₂O)ⱼ—(CF₂)—C(=O)NH—(CH₂)₂—N(CH₃)₂, CF₃CF₂CF₂O(CF₂CF₂O)ᵢ(CF₂O)ⱼ—(CH₂)—C(=O)NH—(CH₂)₂—NH₂, CF₃CF₂CF₂O(CF₂CF₂O)ᵢ(CF₂O)ⱼ—(CH₂OCH₂)—C(=O)NH—(CH₂)₂—NH₂, CF₃CF₂CF₂O(CF₂CF₂O)ᵢ(CF₂O)ⱼ—(CF₂)—C(=O)NH—(CH₂)₂—NH₂, CF₃CF₂CF₂O(CF₂CF₂O)ᵢ(CF₂O)ⱼ—(CH₂)—C(=O)NH—(CH₂)₂—NHCH₃, CF₃CF₂CF₂O(CF₂CF₂O)ᵢ(CF₂O)ⱼ—(CH₂OCH₂)—C(=O)NH—(CH₂)₂—NHCH₃, CF₃CF₂CF₂O(CF₂CF₂O)ᵢ(CF₂O)ⱼ—(CF₂)—C(=O)NH—(CH₂)₂—NHCH₃, CF₃CF₂CF₂O(CF₂CF₂O)ᵢ(CF₂O)ⱼ—(CH₂)—C(=O)NH—(CH₂)₂—N(CH₃)₂, CF₃CF₂CF₂O(CF₂CF₂O)ᵢ(CF₂O)ⱼ—(CH₂OCH₂)—C(=O)NH—(CH₂)₂—N(CH₃)₂, or CF₃CF₂CF₂O(CF₂CF₂O)ᵢ(CF₂O)ⱼ—(CF₂)—C(=O)NH—(CH₂)₂—N(CH₃)₂, and i and j are each independently an integer of 1 to 100.

15. A film comprising a product prepared by hydrolysis and polycondensation of a silane compound represented by Formula 1 comprising a fluorine-containing (poly)ether group;

an amine compound represented by Formula 2 comprising a fluorine-containing (poly)ether group and a product prepared by hydrolysis and polycondensation of a silane compound represented by Formula 1 comprising a fluorine-containing (poly)ether group; or a product prepared by hydrolysis and polycondensation of a silane compound represented by Formula 1 comprising a fluorine-containing (poly)ether group and an amine compound represented by Formula 2 comprising a fluorine-containing (poly)ether group:

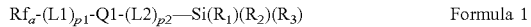  Formula 1

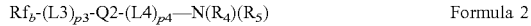  Formula 2 wherein, in Formulae 1 and 2,
$Rf_a$ and $Rf_b$ are each independently the fluorine-containing (poly)ether group,
Q1 is $-N(R_a)-C(=O)O-$, $-C(=O)-N(R_a)-$, $-N(R_a)-S(=O)O-$, $-S(=O)-N(R_a)-$, $-OS(=O)-N(R_a)-C(=O)O-$, or $-OC(=O)-N(R_a)-S(=O)O-$,
Q2 is $-N(R_b)-C(=O)O-$, $-C(=O)-N(R_b)-$, $-N(R_b)-S(=O)O-$, $-S(=O)-N(R_b)-$, $-OS(=O)-N(R_b)-C(=O)O-$, or $-OC(=O)-N(R_b)-S(=O)O-$,
$R_a$ is a hydrogen, a substituted or unsubstituted C1 to C20 alkyl group, a substituted or unsubstituted C6 to C20 aryl group, or $-(L5)_{p5}-Si(R_7)(R_8)(R_9)$,
$R_b$ is a hydrogen, a substituted or unsubstituted C1 to C20 alkyl group, a substituted or unsubstituted C6 to C20 aryl group, or $-(L6)_{p6}-N(R_{11})(R_{12})$,
L1, L2, L3, L4, L5, and L6 are each independently a substituted or unsubstituted C1 to C20 alkylene group, a substituted or unsubstituted C1 to C20 oxyalkylene group, or a combination thereof,
p1, p2, p3, p4, p5, and p6 are each independently an integer of 1 to 10,
$R_1$, $R_2$, $R_3$, $R_7$, $R_8$, and $R_9$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, and
$R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group,
wherein at least one of $R_1$, $R_2$, and $R_3$ is a substituted or unsubstituted C1 to C20 alkoxy group, a halogen atom, or a hydroxyl group, and at least one of $R_7$, $R_8$, and $R_9$ is a substituted or unsubstituted C1 to C20 alkoxy group, a halogen atom, or a hydroxyl group.

16. A display device comprising a film, wherein the film comprises
a product prepared by hydrolysis and polycondensation of a silane compound represented by Formula 1 comprising a fluorine-containing (poly)ether group;
an amine compound represented by Formula 2 comprising a fluorine-containing (poly)ether group and a product prepared by hydrolysis and polycondensation of a silane compound represented by Formula 1 comprising a fluorine-containing (poly)ether group; or
a product prepared by hydrolysis and polycondensation of a silane compound represented by Formula 1 comprising a fluorine-containing (poly)ether group and an amine compound represented by Formula 2 comprising a fluorine-containing (poly)ether group:

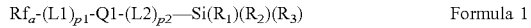  Formula 1

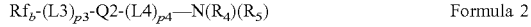  Formula 2 wherein, in Formulae 1 and 2,
$Rf_a$ and $Rf_b$ are each independently the fluorine-containing (poly)ether group,
Q1 is $-N(R_a)-C(=O)O-$, $-C(=O)-N(R_a)-$, $-N(R_a)-S(=O)O-$, $-S(=O)-N(R_a)-$, $-OS(=O)-N(R_a)-C(=O)O-$, or $-OC(=O)-N(R_a)-S(=O)O-$,
Q2 is $-N(R_b)-C(=O)O-$, $-C(=O)-N(R_b)-$, $-N(R_b)-S(=O)O-$, $-S(=O)-N(R_b)-$, $-OS(=O)-N(R_b)-C(=O)O-$, or $-OC(=O)-N(R_b)-S(=O)O-$,
$R_a$ is a hydrogen, a substituted or unsubstituted C1 to C20 alkyl group, a substituted or unsubstituted C6 to C20 aryl group, or $-(L5)_{p5}-Si(R_7)(R_8)(R_9)$,
$R_b$ is a hydrogen, a substituted or unsubstituted C1 to C20 alkyl group, a substituted or unsubstituted C6 to C20 aryl group, or $-(L6)_{p6}-N(R_{11})(R_{12})$,
L1, L2, L3, L4, L5, and L6 are each independently a substituted or unsubstituted C1 to C20 alkylene group, a substituted or unsubstituted C1 to C20 oxyalkylene group, or a combination thereof,
p1, p2, p3, p4, p5, and p6 are each independently an integer of 1 to 10,
$R_1$, $R_2$, $R_3$, $R_7$, $R_8$, and $R_9$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, and
$R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group,
wherein at least one of $Ru$, $R_2$, and $R_3$ is a substituted or unsubstituted C1 to C20 alkoxy group, a halogen atom, or a hydroxyl group, and at least one of $R_7$, $R_8$, and $R_9$ is a substituted or unsubstituted C1 to C20 alkoxy group, a halogen atom, or a hydroxyl group.

17. An article comprising:
a substrate; and
a film layer disposed on the substrate,
wherein the film layer comprises
a product prepared by hydrolysis and polycondensation of a silane compound represented by Formula 1 comprising a fluorine-containing (poly)ether group,
an amine compound represented by Formula 2 comprising a fluorine-containing (poly)ether group and a product prepared by hydrolysis and polycondensation of a silane compound represented by Formula 1 comprising a fluorine-containing (poly)ether group; or
a product prepared by hydrolysis and polycondensation of a silane compound represented by Formula 1 comprising a fluorine-containing (poly)ether group and an amine compound represented by Formula 2 comprising a fluorine-containing (poly)ether group:

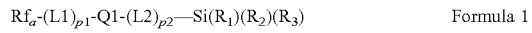  Formula 1

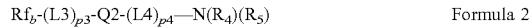  Formula 2 wherein, in Formulae 1 and 2,
$Rf_a$ and $Rf_b$ are each independently the fluorine-containing (poly)ether group,
Q1 is $-N(R_a)-C(=O)O-$, $-C(=O)-N(R_a)-$, $-N(R_a)-S(=O)O-$, $-S(=O)-N(R_a)-$, $-OS(=O)-N(R_a)-C(=O)O-$, or $-OC(=O)-N(R_a)-S(=O)O-$,
Q2 is $-N(R_b)-C(=O)O-$, $-C(=O)-N(R_b)-$, $-N(R_b)-S(=O)O-$, $-S(=O)-N(R_b)-$, $-OS(=O)-N(R_b)-C(=O)O-$, or $-OC(=O)-N(R_b)-S(=O)O-$, $R_a$ is a hydrogen, a substituted or unsubstituted C1 to C20 alkyl group, a substituted or unsubstituted C6 to C20 aryl group, or -(L5)$_{p5}$—Si(R$_7$)(R$_8$)(R$_9$), $R_b$ is a hydrogen, a substituted or unsubstituted C1 to C20 alkyl group, a substituted or unsubstituted C6 to C20 aryl group, or -(L6)$_{p6}$—N(R$_{11}$)(R$_{12}$), L1, L2, L3, L4, L5, and L6 are each independently a substituted or unsubstituted C1 to C20 alkylene group, a substituted or unsubstituted C1 to C20 oxyalkylene group, or a combination thereof, p1, p2, p3, p4, p5, and p6 are each independently an integer of 1 to 10, $R_1$, $R_2$, $R_3$, $R_7$, $R_8$, and $R_9$ are each independently a hydrogen, a substituted or unsubstituted C1 to C20 alkoxy group, a halogen atom, a hydroxyl group, a substituted or unsubstituted C1 to C20 alkyl group, or a substituted or unsubstituted C6 to C20 aryl group, and $R_4$, $R_5$, $R_6$, $R_{10}$, $R_{11}$, and $R_{12}$ are each independently a hydrogen, a substituted or unsubstituted C1 to C20 alkyl group, or a substituted or unsubstituted C6 to C20 aryl group, wherein at least one of Ru, $R_2$, and $R_3$ is a substituted or unsubstituted C1 to C20 alkoxy group, a halogen atom, or a hydroxyl group, and at least one of $R_7$, $R_8$, and $R_9$ is a substituted or unsubstituted C1 to C20 alkoxy group, a halogen atom, or a hydroxyl group.

18. A method of preparing an article, the method comprising disposing the composition of claim 1 on a substrate to form a film layer.

19. The method of claim 18, wherein the composition is in a liquid state or a gas state on the substrate.

20. The method of claim 18 further comprising disposing an interlayer on the substrate before the disposing of the composition.

* * * * *